United States Patent
Hasegawa et al.

(10) Patent No.: US 12,088,164 B2
(45) Date of Patent: Sep. 10, 2024

(54) MOTOR STATOR HAVING ELECTRICAL INSULATORS WITH OVERLAPPING PARTS

(71) Applicant: AICHI ELECTRIC CO., LTD., Kasugai (JP)

(72) Inventors: Masahiro Hasegawa, Kasugai (JP); Shoji Mano, Kasugai (JP)

(73) Assignee: AICHI ELECTRIC CO., LTD., Kasugai (JP)

( * ) Notice: Subject to any disclaimer, the term of this patent is extended or adjusted under 35 U.S.C. 154(b) by 282 days.

(21) Appl. No.: 17/691,707

(22) Filed: Mar. 10, 2022

(65) Prior Publication Data

US 2023/0291265 A1 Sep. 14, 2023

(51) Int. Cl.
H02K 3/38 (2006.01)
H02K 1/18 (2006.01)
H02K 3/28 (2006.01)

(52) U.S. Cl.
CPC ............... *H02K 3/38* (2013.01); *H02K 1/18* (2013.01); *H02K 3/28* (2013.01)

(58) Field of Classification Search
CPC .. H02K 3/38; H02K 3/28; H02K 1/18; H02K 1/185; H02K 1/16; H02K 3/34; H02K 3/345; H02K 2203/12
USPC .............................. 310/71, 214, 215, 216.079
See application file for complete search history.

(56) References Cited

U.S. PATENT DOCUMENTS

| | | | | |
|---|---|---|---|---|
| 2013/0193800 A1* | 8/2013 | Yokogawa | ............. | H02K 3/522 310/215 |
| 2015/0280508 A1* | 10/2015 | Hirota | ................... | H02K 3/522 310/215 |

FOREIGN PATENT DOCUMENTS

| | | | |
|---|---|---|---|
| CN | 114123593 A | * | 3/2022 |
| JP | S63299734 A | | 12/1988 |
| JP | 2002171704 A | | 6/2002 |
| JP | 2015047072 A | | 3/2015 |
| JP | 2015133808 A | | 7/2015 |
| JP | 2016072997 A | | 5/2016 |
| JP | 2016195488 A | | 11/2016 |
| JP | 2016195489 A | | 11/2016 |
| JP | 2016220400 A | | 12/2016 |
| JP | 2017085756 A | | 5/2017 |

(Continued)

OTHER PUBLICATIONS

Machine translation of CN114123593A. (Year: 2022).*
Machine translation of WO2022009521A1. (Year: 2022).*

*Primary Examiner* — Michael Andrews
(74) *Attorney, Agent, or Firm* — J-TEK LAW PLLC; Jeffrey D. Tekanic; Scott T. Wakeman

(57) ABSTRACT

An electrical insulator assembly includes first insulators (200A) and second insulators (200B) that can be fitted onto teeth (121) of a stator core (110) of an electric motor in an alternating manner. Each of the first insulators has a first flange (210), a second flange (220) and a body (230). Each of the second insulators has a first flange (210), a second flange (400) and a body (230). The second flange of the first insulators has first and second overlapping parts (220E, 220F) on opposite circumferential sides. The second flange of the second insulators has first and second overlapping parts (400E, 400F) on opposite circumferential sides. The first overlapping parts (220E) of the first insulators radially overlap the second overlapping parts (400F) of the second insulators, and the second overlapping parts (220F) of the first insulators radially overlap the first overlapping parts (400E) of the second insulators.

16 Claims, 21 Drawing Sheets

(56) References Cited

FOREIGN PATENT DOCUMENTS

| JP | 2017184400 A | 10/2017 |
| JP | 2017184401 A | 10/2017 |
| JP | 2018153056 A | 9/2018 |
| JP | 2018153057 A | 9/2018 |
| JP | 2018153058 A | 9/2018 |
| JP | 2019180170 A | 10/2019 |
| JP | 2019180171 A | 10/2019 |
| WO | 2017175358 A | 10/2017 |
| WO | WO-2022009521 A1 * | 1/2022 |

* cited by examiner

MOTOR STATOR HAVING ELECTRICAL INSULATORS WITH OVERLAPPING PARTS

TECHNICAL FIELD

The present disclosure generally relates to electrical insulators (also known as bobbins, coil bobbins, resin bobbins, etc.) that are designed to be respectively fitted onto teeth of a stator core, to a stator having the electrical insulators fitted onto the teeth of the stator core, and to a motor comprising the same.

BACKGROUND ART

Various kinds of motors having a stator and a rotor have been used, for example, as a compressor-driving motor, a vehicle-driving motor and an onboard-equipment-driving motor. Particularly, a motor (more specifically, a so-called "concentrated winding motor") in which a stator winding (winding wire) is wound around teeth of a stator core of the stator in a concentrated manner has been used in such applications. In a concentrated winding motor, the stator windings are respectively wound around the teeth via (over) an insulator (i.e. a so-called "resin bobbin").

Such a concentrated winding motor has been provided with a stator core having a split (divided) structure in order to increase the number of turns of the stator windings (that is, to improve the space factor (fill factor) of the stator windings in the slots defined by the stator core). A stator core having a split structure includes a plurality of split cores formed by splitting (dividing) the stator core.

Such motors using a stator core having a split structure are disclosed, for example, in the below-identified Patent Documents 1 to 3.

In the motor disclosed in Patent Document 1, the stator core is split (divided) into a plurality of core pieces that are connected at equal intervals in the circumferential direction. Each of the core pieces has a back yoke and a tooth extending inward from the back yoke.

Insulators (herein, the terms "insulator" and "electrical insulator" are used in an interchangeable manner) are respectively mounted to (on) the core pieces, which each have a back yoke and a tooth, that form the stator core. Stator windings are respectively wound around (over) the insulators. A pin insertion hole is formed in each of the two end parts of each insulator as shown in FIG. 5 of Patent Document 1. Adjacent insulators are connected by respectively inserting connecting pins into the pin insertion holes while the pin insertion holes of the adjacent insulators are aligned with each other.

In the motor disclosed in Patent Document 2, the stator core is split (divided) into a plurality of radially arranged teeth and a ring-shaped yoke as shown in FIG. 1 of Patent Document 2.

Insulators, each having a coil wound thereon, are respectively mounted onto each of the teeth. The stator core is formed by fitting (radially inserting) an outer end part of each of the teeth into the interior of the ring-shaped yoke in the radial direction.

In the motor shown in FIG. 2 of Patent Document 3, the stator core is split (divided) into an annular stator core body and a teeth-connected body having a plurality of connected teeth.

A polygonal hole is formed in a central part of the stator core body, and a fitting groove is formed in a central part of each of the side surfaces of the hole.

Stator windings are respectively wound around each of the teeth via (over) an insulator.

The stator core body and the teeth-connected body having the stator windings wound around each of the teeth are integrally assembled together by radially press-fitting an outer end part of each tooth into the fitting groove of the stator core body.

The stator windings wound around adjacent teeth have different phases (U-phase, V-phase, W-phase) from each other as shown in FIG. 5 of Patent Document 3. Therefore, it is necessary to provide electrical insulation between adjacent stator windings and electrical insulation between the stator windings and the stator core.

In the motor shown in FIG. 6 of Patent Document 3, a radially-outer end part of the insulators is obliquely cut off, so that a gap is formed between a cut face of the outer end part of the insulators and an inner face of the stator core body. A central part of a winding insulation member (i.e. a so-called "interphase insulation member"), which has been folded into a T-shape, is inserted between the adjacent stator windings, and each of the end parts of the winding insulation member is inserted into the gap between the cut face and the inner face of the stator core.

PRIOR ART DOCUMENTS

Patent Documents

Patent Document 1: PCT International Publication No. WO 2017/175358

Patent Document 2: Japanese Unexamined Patent Application Publication No. S63(1988)-299734

Patent Document 3: Japanese Unexamined Patent Application Publication No. 2002-171704

SUMMARY

In the stator disclosed in Patent Document 1, a tooth tip part formed on a radially-inner end of a tooth radially abuts on an inner side surface of the insulator. Thus, the creepage distance between the stator winding wound around the insulator and the tooth tip part is short. Therefore, when the stator disclosed in Patent Document 1 is used in a high voltage motor, partial discharge may disadvantageously occur between the stator windings and the tooth tip parts. Furthermore, connecting pins for connecting the adjacent insulators are needed, so that the number of components (i.e., the part count) increases.

In the stators disclosed in Patent Documents 2 and 3, radially-inward gaps are formed between adjacent insulators mounted on the teeth. Thus, the creepage distance between the stator winding wound around the insulator and the tooth tip part is short. Therefore, like in the stator disclosed in Patent Document 1, partial discharge may disadvantageously occur between the stator windings and the tooth tip parts.

Accordingly, it is one non-limiting object of the present disclosure to disclose techniques for improving electrical insulators (e.g., bobbins) for a motor that provides better electrical insulating performance (properties) between a stator winding and a tooth tip part.

A first aspect of the present disclosure relates to insulators (e.g., bobbins), in particular electrical insulators, that are designed to be respectively fitted onto a plurality of teeth of a stator. The radially-extending teeth are spaced apart from each other in a circumferential direction and extend in an axial direction in a state in which the insulators are fitted onto the teeth of the stator.

Each of the insulators of the first aspect has a first flange, a second flange and a body.

The first flange extends in the circumferential direction and the axial direction (when installed in the stator). The second flange is arranged (disposed) radially inward of the first flange and extends in the circumferential direction and the axial direction. The body extends radially, connects the first flange and the second flange, and has a through hole inside, into which one of the teeth is insertable.

The second flange has overlapping parts respectively formed on one side and the other side of the through hole in the circumferential direction and extending in the circumferential direction and the axial direction.

The overlapping parts of the insulators, which are disposed adjacent to each other in the circumferential direction, are configured to radially overlap each other in the state in which the insulators are respectively fitted onto the teeth.

According to the first aspect, a gap between the insulators adjacent in the circumferential direction is closed. This improves electrical insulating performance (properties) between stator windings respectively wound around the insulators and the corresponding tooth tip parts thereof.

In another embodiment, the insulators may include first insulators and second insulators. Each of the first and second insulators may have the first flange, the second flange and the body.

Each of the second flanges of the first and second insulators may have the overlapping parts respectively formed on one side and the other side of the through hole in the circumferential direction and extending in the circumferential direction and the axial direction.

The first insulators and the second insulators are respectively fitted onto the teeth in an alternating manner.

The overlapping parts, which are adjacent to each other in the circumferential direction, are configured to radially overlap each other in the state in which the first and second insulators are respectively fitted onto the teeth in an alternating manner.

According to this embodiment, electrical insulating performance (properties) between stator windings respectively wound around the insulators and the corresponding tooth tip parts thereof is improved.

In another embodiment, one of the two adjacent overlapping parts, which are radially overlapped with each other, has an abutment part that restricts (limits) the position of the other adjacent overlapping part.

In the state in which the other overlapping part overlaps the one overlapping part from the one side in the circumferential direction, the abutment part of the one overlapping part has a first abutment part configured to abut on a side surface of the other overlapping part on the other side in the circumferential direction, and a second abutment part configured to abut on an end wall of the other overlapping part on the one side in the axial direction.

In the state in which the other overlapping part is overlapped with the one overlapping part from the other side in the circumferential direction, the abutment part of the one overlapping part has a first abutment part configured to abut on a side surface of the other overlapping part on the one side in the circumferential direction, and a second abutment part configured to abut on an end wall of the other overlapping part on the one side in the axial direction.

According to this embodiment, the adjacent overlapping parts can be accurately overlapped with each other.

In another embodiment, the other one of the two overlapping parts that are radially overlapped with each other has an abutment part that restricts a position of the one overlapping part.

In the state in which the one overlapping part is radially overlapped with the other overlapping part from the one side in the circumferential direction, the abutment part of the other overlapping part is configured to abut on a side surface of the one overlapping part on the other side in the circumferential direction.

In the state in which the one overlapping part is radially overlapped with the other overlapping part from the other side in the circumferential direction, the abutment part of the other overlapping part is configured to abut on a side surface of the one overlapping part on the one side in the circumferential direction.

According to this embodiment as well, the adjacent overlapping parts can be more accurately overlapped with each other.

In another embodiment, each of the overlapping parts has an overlapping face extending in the circumferential direction and the axial direction.

The two adjacent overlapping parts are overlapped with each other such that the overlapping face of the one overlapping part is arranged (disposed) radially outward of the overlapping face of the other overlapping part.

The other overlapping part has a recess forming face that is formed radially outward of the abutment part of the other overlapping part and defines a portion of a recessed part.

The one overlapping part has a recess forming face that is formed radially outward of the side surface that abuts on the abutment part of the other overlapping part, and defines the other (remaining) portion of the recessed part.

According to this embodiment, movement of a winding insulation member that is inserted between adjacent stator windings wound around the insulators is prevented.

In another embodiment, each of the overlapping parts has an overlapping face extending in the circumferential direction and the axial direction.

The overlapping parts are configured such that an open angle between the insulators adjacent in the circumferential direction corresponds to an open angle between teeth adjacent in the circumferential direction in the state in which the overlapping faces of the two adjacent overlapping parts are overlapped to face each other.

According to this embodiment, ease of mounting the insulators is ensured.

In another embodiment of the first aspect, each of the overlapping parts has an overlapping face extending in the circumferential direction and the axial direction.

Two adjacent overlapping parts are overlapped with each other such that the overlapping face of the overlapping part of the first insulator is arranged (disposed) radially outward of the overlapping face of the overlapping part of the second insulator.

According to this embodiment, the first and second insulators can be easily mounted onto the teeth.

A second aspect of the present disclosure relates to a stator having a stator core, a plurality of insulators and stator windings.

The stator core has a yoke extending in a circumferential direction (i.e. an annular yoke), and a plurality of teeth spaced apart from each other in the circumferential direction and extending radially inward from the yoke. The insulators are respectively fitted onto the teeth. The stator windings are respectively wound around the insulators fitted onto the teeth. Any of the insulators described above in the first aspect may be used as the insulators of the second aspect of the present disclosure.

According to this second aspect, the insulators have the same effect as the insulators of the above-described first aspect.

In another embodiment, the stator further has at least one winding insulation member.

The at least one winding insulation member has a central part extending in the axial direction and the radial direction, and a pair of end parts folded in opposite directions from both ends of the central part in the circumferential direction and extending in the axial direction and the circumferential direction.

The first flange of the insulator has a radially-outer peripheral surface. The outer peripheral surface of the first flange has a first recessed part formed on the one side of the through hole in the circumferential direction and a second recessed part formed on the other side of the through hole in the circumferential direction. The first recessed part is open to the one side in the circumferential direction, the other side in the axial direction and radially outwardly; the second recessed part is open to the other side in the circumferential direction, the other side in the axial direction and radially outwardly.

The central part of the at least one winding insulation member is arranged (disposed) between two of the insulators that are adjacent in the circumferential direction. The end parts of the at least one winding insulation member are respectively arranged (disposed) in the first recessed part of one of the insulators adjacent in the circumferential direction and the second recessed part of the other of the insulators.

According to this embodiment, the position of the winding insulation member that is inserted (disposed) between the stator windings respectively wound around adjacent ones of the insulators is restricted (limited, bounded) in the circumferential direction and the axial direction.

In another embodiment, the first flange has side surfaces on the one side in the circumferential direction and the other side in the circumferential direction. At least one of the side surfaces on both sides in the circumferential direction has a projection on the other side in the axial direction. The projection formed on the one side in the circumferential direction protrudes from the side surface on the one side in the circumferential direction toward the one side in the circumferential direction, and the projection formed on the other side in the circumferential direction protrudes from the side surface on the other side in the circumferential direction toward the other side in the circumferential direction.

The projection formed on the at least one of the side surfaces on both sides of the first flange in the circumferential direction restricts (blocks, limits) movement of the at least one winding insulation member toward the other side in the axial direction.

According to this embodiment, movement of the winding insulation member that is inserted between the stator windings wound around the insulators is prevented.

In another embodiment, the stator core includes a first core member having a plurality of teeth and a second core member having a yoke.

According to this embodiment, the number of turns of the stator windings can be increased.

A third aspect of the present disclosure relates to a motor having a stator and a rotor that is arranged rotatably relative to the stator. Any of the stators described above in the second aspect may be used as the stator of the third aspect of the present disclosure.

According to this aspect, the stator has the same effect as the stator of the above-described second aspect.

By using any of the insulators of the present disclosure, electrical insulating properties of the stator and/or of the motor can be improved.

DETAILED DESCRIPTION OF THE EMBODIMENTS

This detailed description is merely intended to teach a person skilled in the art further details for practicing preferred aspects of the present teachings and is not intended to limit the scope of the invention. Combinations of features and steps disclosed within the following detailed description may not be necessary to practice the invention in the broadest sense, and are instead taught merely to particularly describe some representative examples of the invention, which detailed description will now be given with reference to the accompanying drawings.

A representative embodiment according to the present teachings is now described with reference to the drawings.

In this description, the term "axial direction" refers to an extending direction of a rotation center line (rotational axis) P (see FIG. 1) of a rotor, in the state in which the rotor is arranged to be rotatable relative to a stator.

The term "circumferential direction" refers to a circumferential direction around the rotation center line P as viewed in a cross section orthogonal to the axial direction, in the state in which the rotor is arranged to be rotatable relative to the stator.

The terms "radially" and "radial direction" refer to a direction crossing (intersecting) the rotation center line P as viewed in a cross section orthogonal to the axial direction, in the state in which the rotor is arranged to be rotatable relative to the stator. The terms "radially inward" or "inside (or inward) in the radial direction" refer to one side of the rotation center line P in the radial direction, and the terms "radially outward" or "outside (or outward) in the radial direction" refer to the other side that is opposite of the rotation center line P in the respective radial direction. In the Figures, "Y" indicates a radial direction, arrow "Y1" indicates the radially inward direction and arrow "Y2" indicates the radially outward direction.

As for an insulator, the terms "axial direction", "circumferential direction" and "radial direction" respectively refer to the "axial direction", "circumferential direction" and "radial direction" of the insulator in the state in which it is mounted on one of the teeth of a stator core.

Further, the terms "parallel", "orthogonal" and "flat" include "substantially parallel", "substantially orthogonal" and "substantially flat", respectively.

Figure 1:
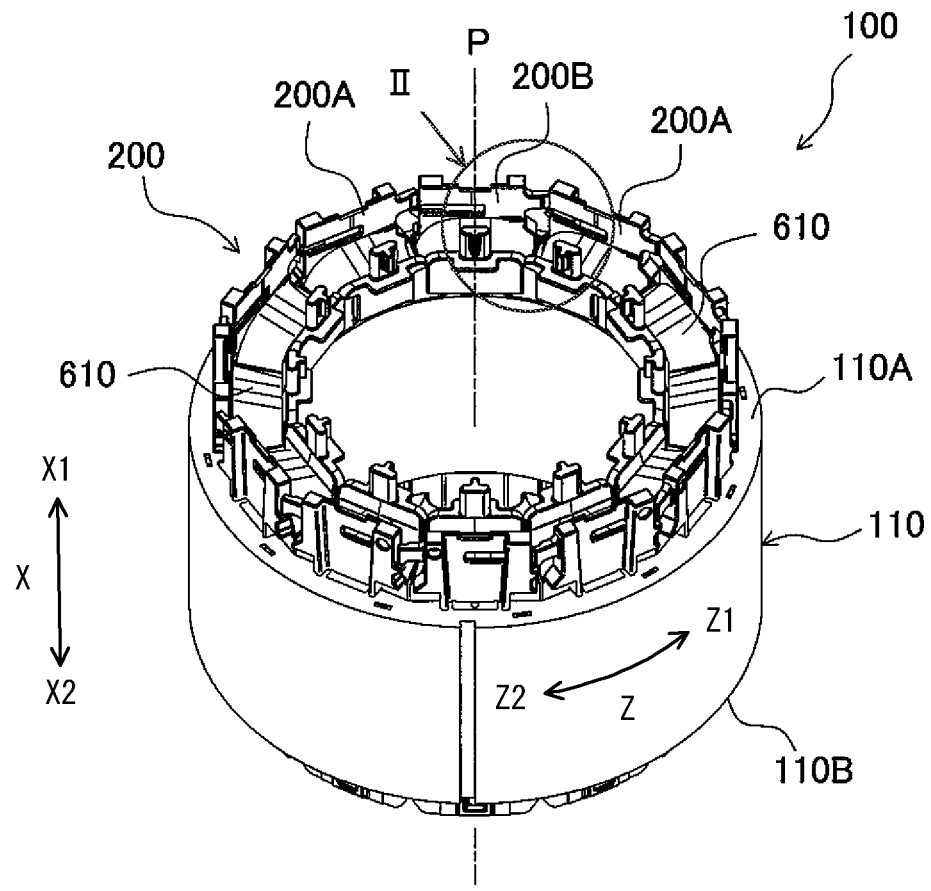
FIG. 1 is a perspective view of a stator according to an embodiment of the present disclosure.
Figure 5:
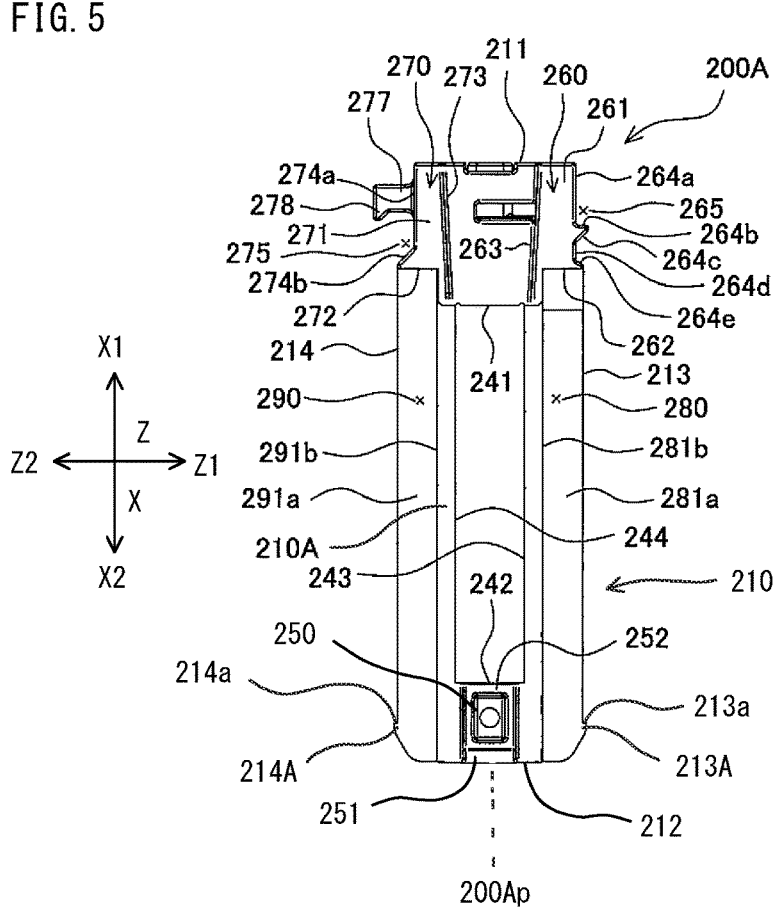
FIG. 5 shows the first insulator as viewed from the direction of arrow V in FIG. 4.
Figure 13:
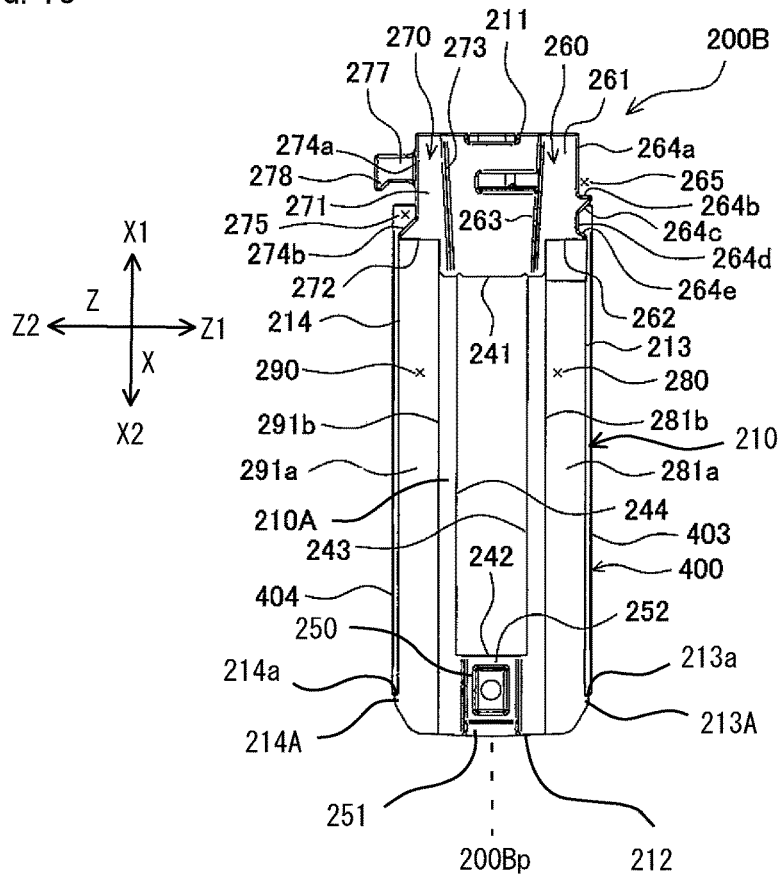
FIG. 13 shows the second insulator as viewed from the direction of arrow XIII in FIG.

In this description, with regard to, e.g., FIGS. 1, 5 and 13, the terms "one side in the axial direction" (or "first side in the axial direction") and the "other side in the axial direction" (or "second side in the axial direction") are used for convenience to refer to upper and lower sides, respectively. In the Figures, "X" indicates the axial direction, arrow "X1" indicates the one (first) side on the axial direction and arrow "X2" indicates the other (second) side on the axial direction Further, the terms "one side in the circumferential direction" (or "first side in the circumferential direction") and the "other side in the circumferential direction" (or "second side in the circumferential direction") are respectively used to refer to a counterclockwise direction (right side in FIGS. 5 and 13) and a clockwise direction (left side in FIGS. 5 and 13) around the rotation center line P as viewed from the one (first) side in the axial direction. In the Figures, "Z" indicates the circumferential direction, arrow "Z1" indicates the one (first) side in the circumferential direction and arrow "Z2" indicates the other (second) side in the circumferential direction.

The "one" (or "first") and the "other" (or "second") in each of these directions may be used in reverse.

The term "insulator" is intended to mean a structure having electrical insulating properties such that the terms "insulator" and "electrical insulator" are used in an interchangeable manner in the present disclosure. Insulators according to the present teachings also may be referred as bobbins, coil bobbins, resin bobbins, etc.

An embodiment of a stator according to the present teachings is now described with reference to FIGS. 1 to 28.

Figure 2:
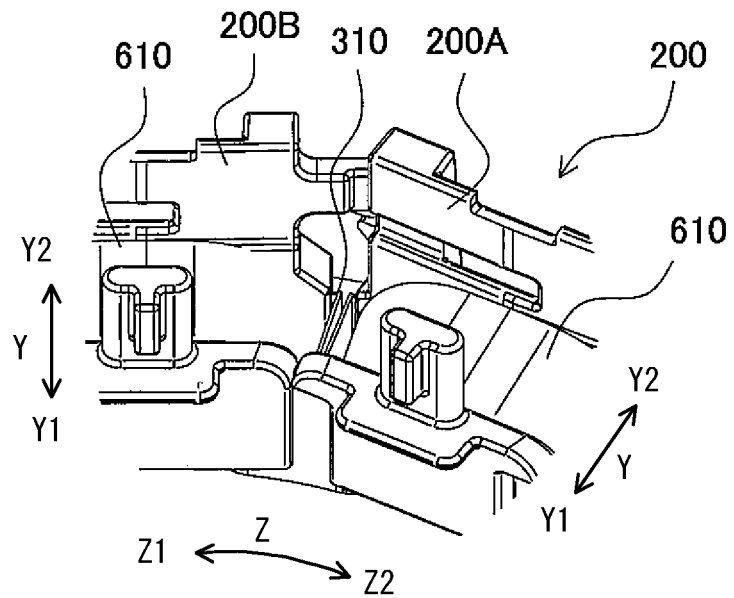
FIG. 2 is an enlarged view of the region within the circle indicated by arrow II in FIG. 1.

FIG. 1 is a perspective view of a stator 100 of the embodiment, and FIG. 2 is an enlarged view of the region within the circle indicated by arrow II in FIG. 1. FIG. 1 shows the lead side of the stator 100. The "lead side of the stator" refers to the side to which lead wires (connecting wires) to be connected to a power source are pulled out (extend).

The stator 100 includes a stator core 110, an insulator assembly 200, stator windings (coils) 610 and winding (coil) insulation members 310.

The stator core 110 has core end faces 110A and 110B respectively on the one (first) side and the other (second) side in the axial direction.

Figure 3:
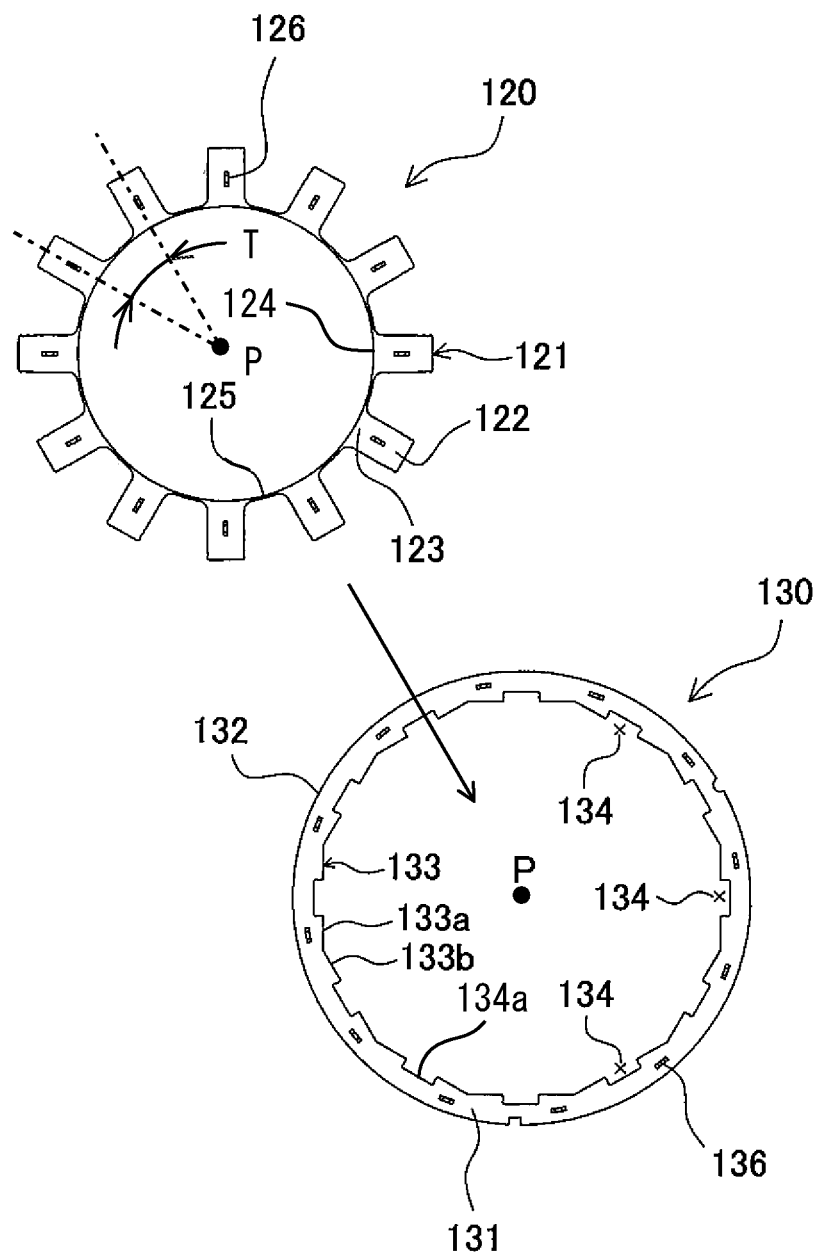
FIG. 3 illustrates a stator core of the stator of the embodiment.

The stator core 110 is configured to have a split structure, which also may be referred to as segmented structure or a divided structure. In this embodiment, as shown in FIG. 3, the stator core 110 includes a first core member 120 and a second core member 130.

The first core member 120 (also referred to as an "inner core") is a laminate of a plurality of electromagnetic steel sheets, which are stacked on top of each other and laminated together by using calking projections (connecting projections) 126. The first core member 120 has a plurality of teeth 121 extending in respective radial directions with respect to the rotation center point P and spaced apart from each other in the circumferential direction at regular (equal) intervals. Each of the teeth 121 has a tooth base part 122 that extends radially and a tooth tip part 123, which is formed on (at) a radially-inner end of the tooth base part 122 and extends in the circumferential direction. The tooth tip parts 123 of the teeth 121, which are adjacent in the circumferential direction, are respectively connected by connecting parts 125.

The second core member 130 (also referred to as an "outer core") is a laminate formed by a plurality of electromagnetic steel sheets, which are stacked on top of each other and laminated together by using calking projections (connecting projections) 136. The second core member 130 has a yoke 131, preferably a ring-shaped yoke 131, extending in the circumferential direction and defining a yoke inner peripheral surface 133.

The yoke 131 also has a yoke outer peripheral surface 132 and recess forming faces 134a that are respectively recessed in the radial outward direction from the yoke inner peripheral surface 133. Each of the recess forming faces 134a defines a recess 134 in which a radially-outer end part of one of the teeth 121 (specifically, the tooth base part 122) of the first core member 120 is fitted (inserted). The yoke inner peripheral surface 133 has yoke inner peripheral surface parts 133a, 133b formed between adjacent ones of the recesses 134 (the recess forming faces 134a) in the circumferential direction.

The yoke inner peripheral surface parts 133a, 133b are inclined such that the width of the yoke 131 in the radial direction decreases from a connection between the yoke inner peripheral surface part 133a and the recess 134 and a connection between the yoke inner peripheral surface part 133b and the recess 134 toward a center between the adjacent recesses 134 (toward a central part of the yoke inner peripheral surface 133) in the circumferential direction. In other words, the yoke inner peripheral surface parts 133a, 133b may form a V-shape as viewed in the axial direction.

The stator core 110 is formed by respectively inserting the radially-outer end parts of the tooth base parts 122 (on the side opposite to the tooth tip parts 123) of the first core member 120 into the recesses 134 of the second core member 130. For example, the radially outer end parts of the tooth base parts 122 are press-fitted, shrink-fitted or expansion-fitted into the recesses 134. Thus, the stator core 110 formed in this manner includes the yoke 131, the teeth 121 and the connecting parts 125. The yoke 131 extends in the circumferential direction and the teeth 121 each extend radially inward from the yoke 131. Each of the teeth 121 has the tooth base part 122 extending radially inward from the yoke 131 and the tooth tip part 123 extending radially from the inner end of the tooth base part 122 towards both sides in the circumferential direction. The adjacent tooth tip parts 123 of the teeth 121 are respectively connected by the connecting parts 125 extending in the circumferential direction. In addition, the yoke 131 and the adjacent teeth 121 define slots (or gaps).

Figure 20:
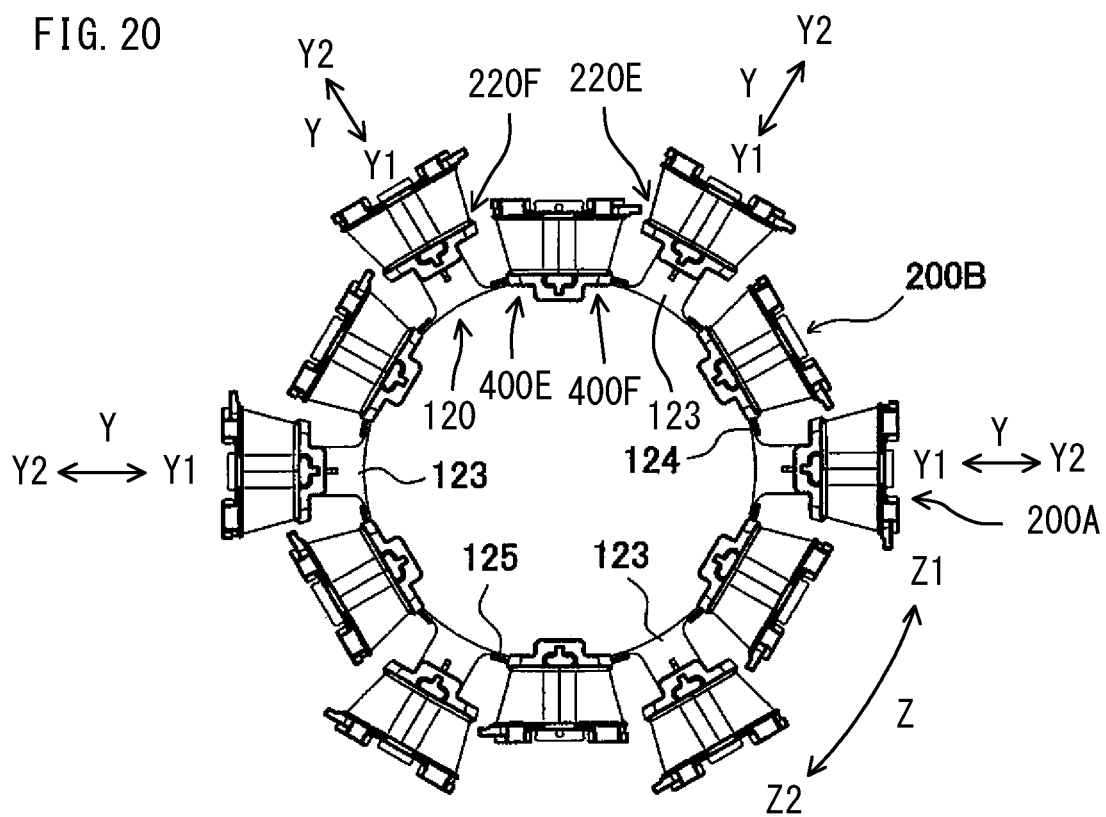
FIG. 20 is a drawing for illustrating how to mount first insulators and second insulators to (on) a first core member of the stator core.

Each of the tooth tip parts 123 has a radially-inward tooth tip surface 124 (see e.g., FIG. 20). The tooth tip surfaces 124 collectively define a rotor insertion (receiving) space.

The stator 100 and the rotor (not shown) that is rotatably inserted into the rotor insertion space form one representative, non-limiting motor according to the present teachings. Various known rotors may be used as the rotor in embodiments of the present teachings, such that the rotor design is not particularly limited in the present disclosure.

The stator windings (coils) 610 (see FIGS. 1 and 2) are wound around the insulator assembly 200 mounted on the teeth 121. Thus, the stator windings 610 are respectively wound around the teeth 121 in a concentrated manner, e.g., to make a concentrated winding motor. Various methods may be employed to wind the stator windings 610 around the teeth 121. For example, the stator windings 610 may be wound around the insulator assembly 200 with the insulator assembly 200 already mounted on the teeth 121, or the insulator assembly 200 may be mounted onto the teeth 121 with the stator windings 610 already wound on the insulator assembly 200.

The insulator assembly 200 is now described. In this embodiment, the insulator assembly 200 includes first insulators 200A and second insulators 200B that partially overlap each other in the assembled state.

Figure 4:
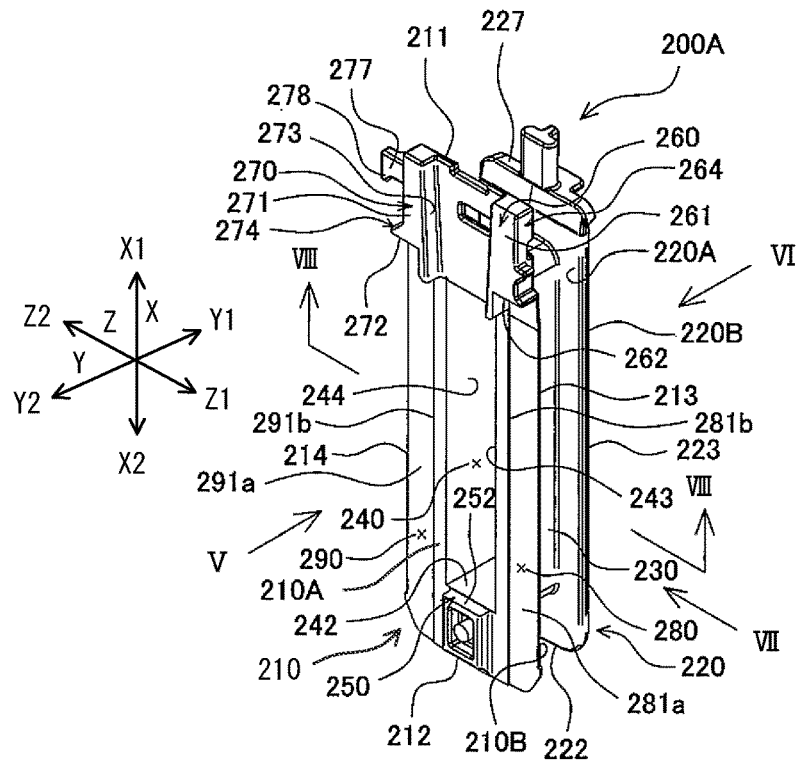
FIG. 4 is a perspective view of a first insulator of the stator of the embodiment.
Figure 6:
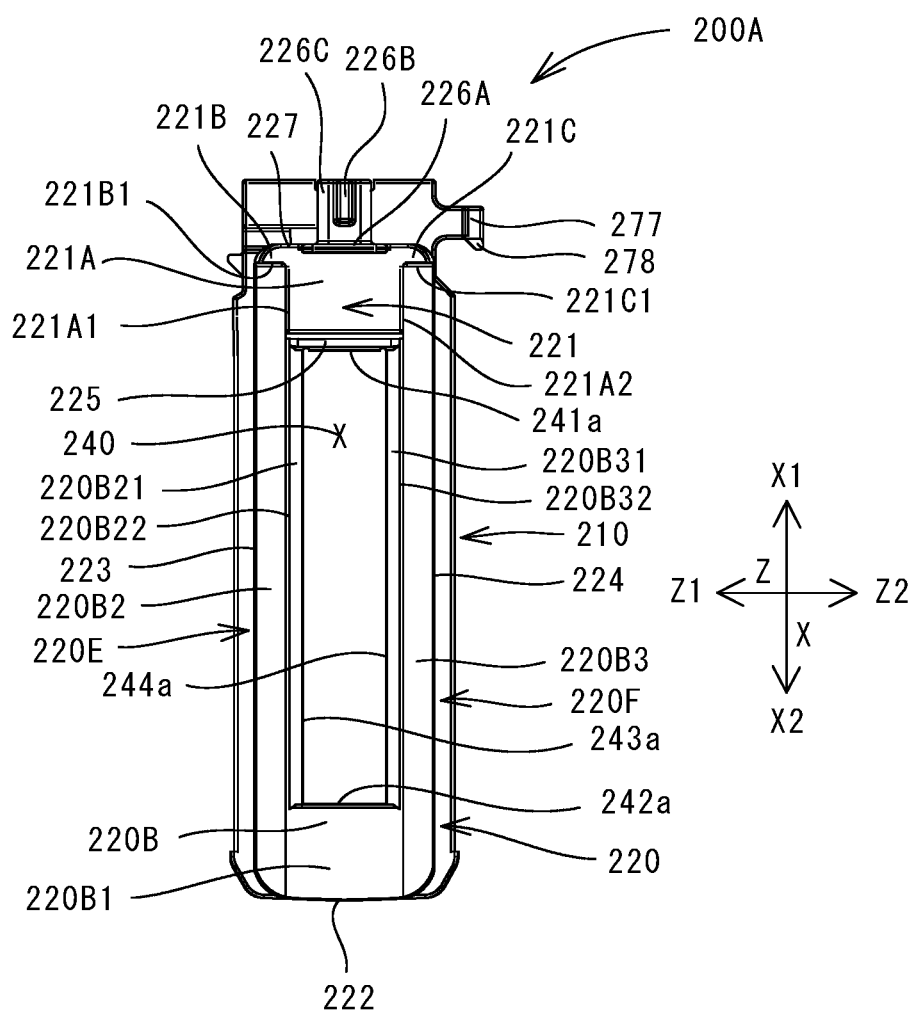
FIG. 6 shows the first insulator as viewed from the direction of arrow VI in FIG. 4.
Figure 7:
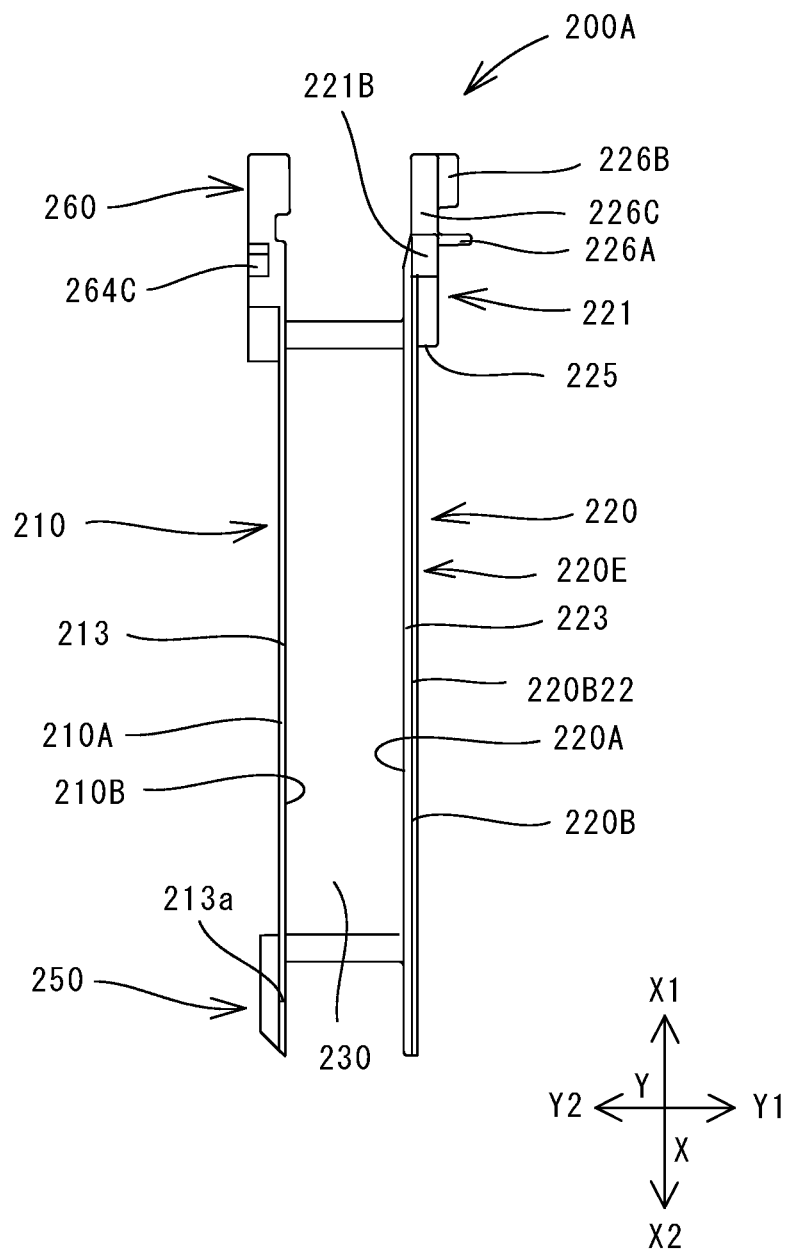
FIG. 7 shows the first insulator as viewed from the direction of arrow VII in FIG. 4.
Figure 8:
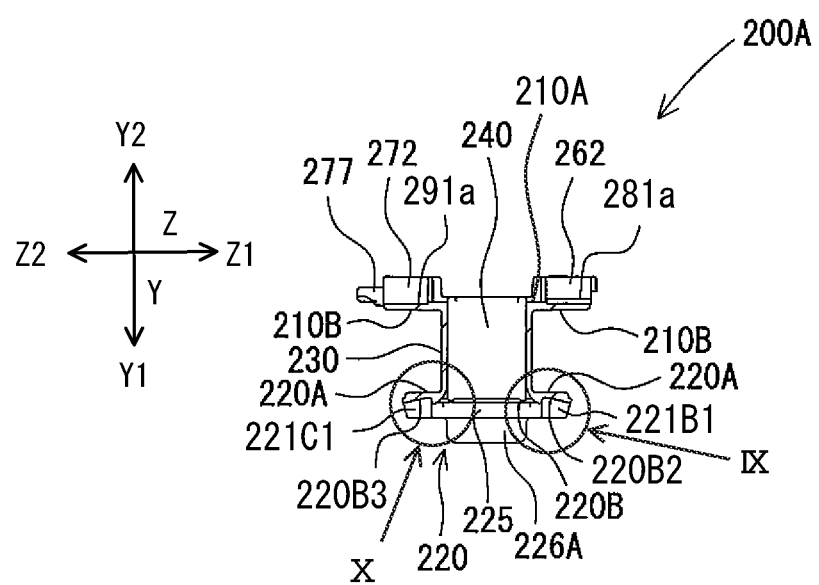
FIG. 8 is a sectional view taken along line in FIG. 4.
Figure 9:
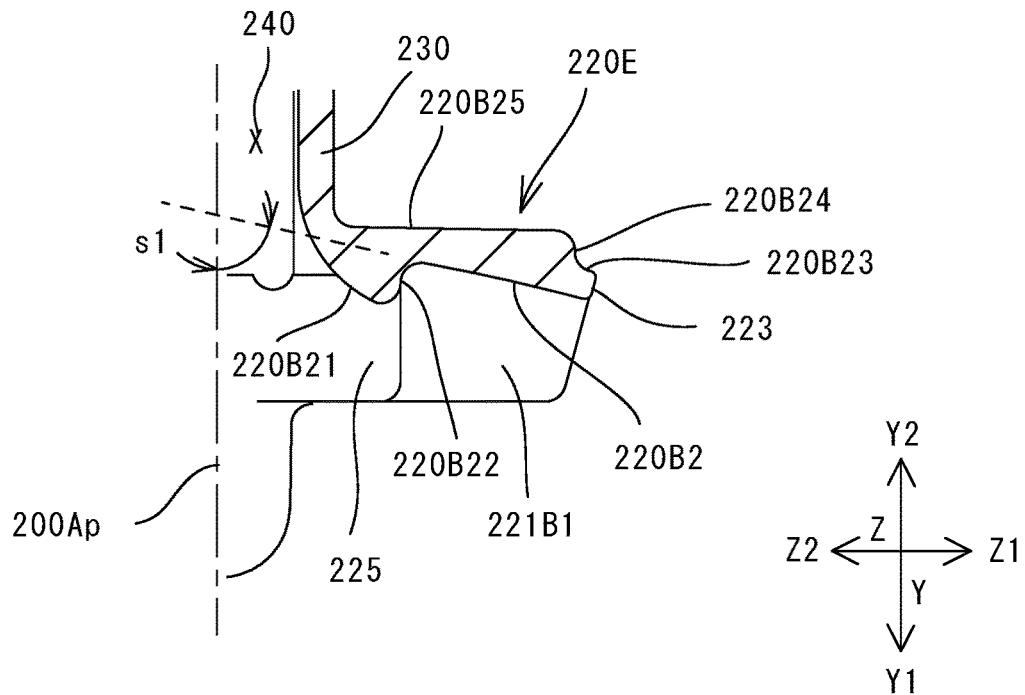
FIG. 9 is an enlarged view of the region within the circle indicated by arrow IX in FIG.
Figure 10:
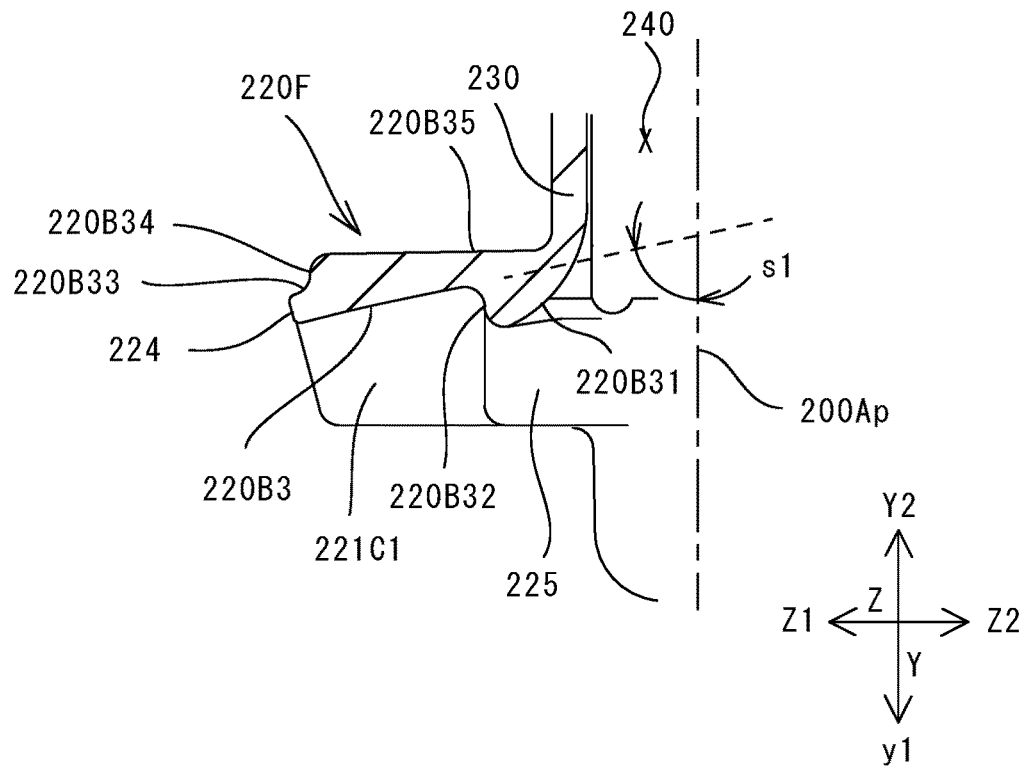
FIG. 10 is an enlarged view of the region within the circle indicated by arrow X in FIG.

First, a representative, non-limiting embodiment of the first insulators 200A is described with reference to FIGS. 4 to 10. Each of the first insulators 200A used in one motor preferably has the same design. FIG. 4 is a perspective view of the first insulator 200A. FIG. 5 shows the first insulator 200A as viewed from the direction of arrow V in FIG. 4 (from the outside in the radial direction). FIG. 6 shows the first insulator 200A as viewed from the direction of arrow VI in FIG. 4 (i.e. as viewed from inside in the radial direction). FIG. 7 shows the first insulator 200A as viewed from the direction of arrow VII in FIG. 4 (from the one (first) side in the circumferential direction). FIG. 8 is a sectional view taken along line in FIG. 4. FIGS. 9 and 10 are enlarged views of regions in circles respectively indicated by arrows IX and X in FIG. 8.

Each of the first insulators 200A is formed (composed) of resin (polymer) having electrical insulating properties, such as polybutylene terephthalate (PBT), polyphenylene sulfide (PPS), liquid crystal polymer (LCP) and nylon (polyamide).

Each of the first insulators 200A has a first flange 210, a second flange 220 and a body 230.

The first flange 210 extends in the axial direction and the circumferential direction. The first flange 210 has an outer peripheral surface 210A on its radially outer side (the front side in FIG. 5), an inner peripheral surface 210B on its radially inner side (the back side in FIG. 5), an (a first) end surface 211 on the one (first) side (upper end in FIG. 5) in the axial direction, an (a second) end surface 212 on the other (second) side (lower end in FIG. 5) in the axial direction, a (first) side surface 213 on the one (first) side (right end in FIG. 5) in the circumferential direction, and a (second) side surface 214 on the other (second) side (left end in FIG. 5) in the circumferential direction.

The second flange 220 is arranged radially inward of the first flange 210 and extends in the axial direction and the circumferential direction. The second flange 220 has an outer peripheral surface 220A on its radially outer side, an inner peripheral surface 220B on its radially inner side, an (a first) end surface 227 on the one (first) side in the axial direction, an (a second) end surface 222 on the other (second) side in the axial direction, a (first) side surface 223 on the one (first) side in the circumferential direction and a (second) side surface 224 on the other (second) side in the circumferential direction.

The body 230 is formed (extends) between the first and second flanges 210, 220 and thus extends radially. In other words, the body 230 extends perpendicularly, or at least substantially perpendicularly, to the extension directions of the first and second flanges 210, 220. The body 230 has a through hole 240 that opens to the outer peripheral surface 210A of the first flange 210 and to the inner peripheral surface 220B of the second flange 220.

Figure 11:
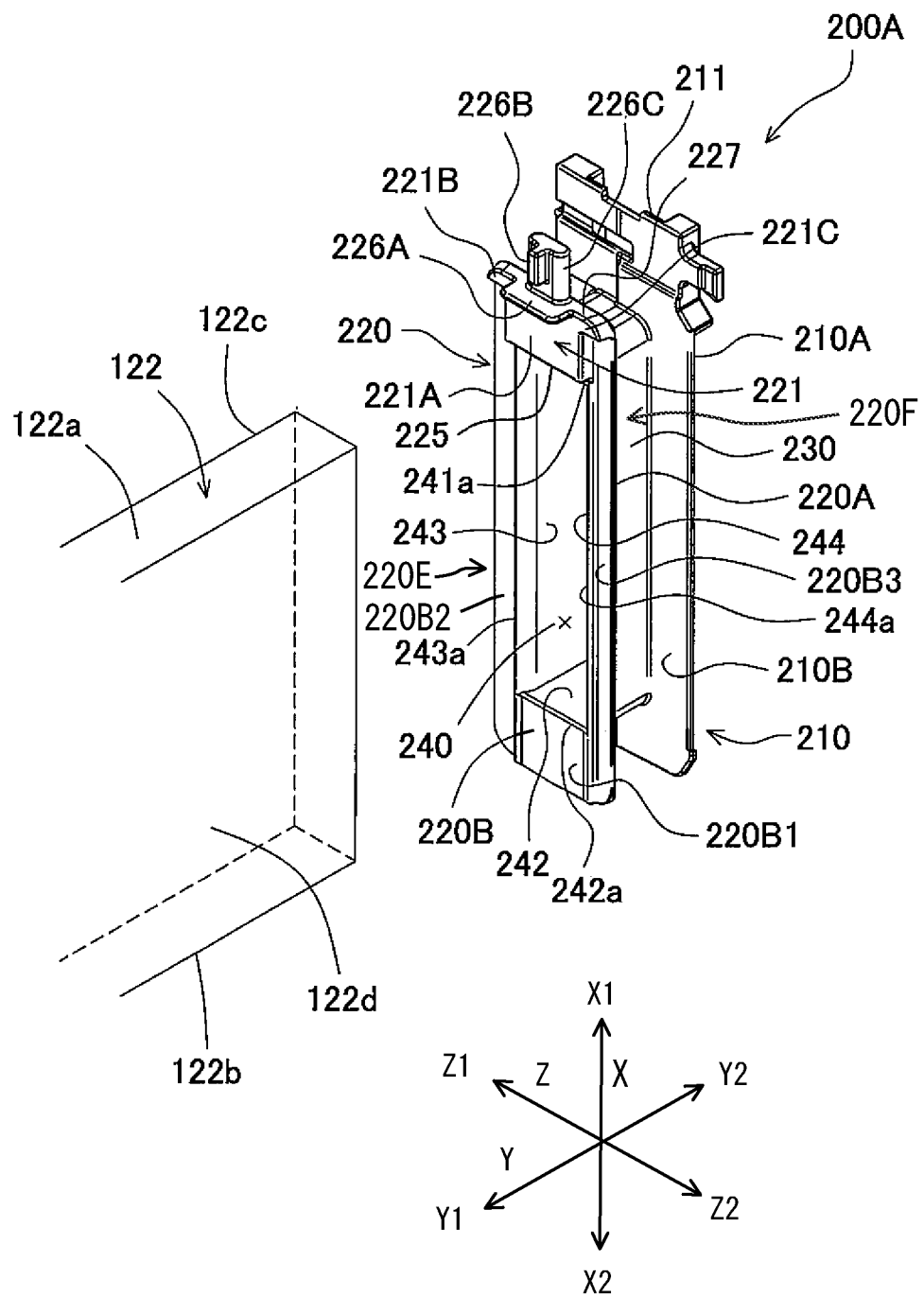
FIG. 11 is a drawing for illustrating how to mount a first insulator onto a tooth.

The through hole 240 is defined by inner wall surfaces 241 to 244. In this embodiment, as shown in FIG. 11, the end part of the tooth base part 122 is inserted into the through hole 240 from the side of the second flange 220 in such a manner that outer wall surfaces 122a, 122b, 122c and 122d of the tooth base part 122 face the inner wall surfaces 241, 242, 243 and 244 of the through hole 240, respectively.

As shown in FIG. 6, the inner wall surfaces 241, 242, 243 and 244 of the through hole 240 respectively have inclined faces 241a, 242a, 243a and 244a on the side of the inner peripheral surface 220B of the second flange 220. These inclined faces 241a, 242a, 243a and 244a facilitate the insertion of the tooth base part 122 into the through hole 240 of the first insulator 200A while preventing displacement of the first insulator 200A relative to the tooth base part 122 in the axial direction and the circumferential direction.

As shown in FIGS. 4 and 5, the first flange 210 has projections 250, 260 and 270 protruding radially outward from the outer peripheral surface 210A. In this embodiment, the outer peripheral surface 210A is a flat surface extending in the circumferential direction and the axial direction.

The projection 250 is formed on (at) the side of the end surface 212 of the through hole 240. The projection 250 has an (a first) outer wall surface 251 on the side of the end surface 212 and an (a second) outer wall surface 252 on the side of the through hole 240. The (first) outer wall surface 251 is inclined such that the distance between the (first) outer wall surface 251 and the outer peripheral surface 210A increases in the direction extending from the side of the end surface 212 toward the side of the through hole 240. This facilitates the insertion of the end part of the tooth base part 122, which will outwardly radially protrude from (beyond) the through hole 240 (the outer peripheral surface 210A) of the first insulator 200A, into the recess 134 of the second core member 130 in the installed state of the insulator 200A.

The projection 260 is formed on (at) the side of the end surface 211 (the one (first) side in the axial direction) and on (at) the side of the side surface 213 (the one (first) side in the circumferential direction) of the through hole 240. The projection 260 has outer wall surfaces 261 to 264. The outer wall surface 261 is formed on the radially outer side and extends in the circumferential direction and the axial direction. The outer wall surface 262 is formed on the other (second) side in the axial direction and extends in the circumferential direction and the radial direction. The outer wall surface 264 is formed on the one (first) side in the circumferential direction (the side facing away from the projection 270) and extends in the axial direction. The outer wall surface 263 is formed on the other (second) side in the circumferential direction (the side facing the projection 270) and extends in the axial direction. Further, an outer wall surface of the projection 260 on the one (first) side in the axial direction is formed by the end surface 211 of the first flange 210.

The outer wall surface 264 has a first outer wall surface part 264*a*, a second outer wall surface part 264*b*, a third outer wall surface part 264*c*, a fourth outer wall surface part 264*d* and a fifth outer wall surface part 264*e* in order in the direction extending from the one (first) side to the other (second) side in the axial direction. In this embodiment, the outer wall surface parts 264*a* and 264*d* extend substantially on (along) the same line in parallel to the axial direction. The outer wall surface part 264*b* extends orthogonally to the axial direction from an end of the outer wall surface part 264*a* on the other (second) side in the axial direction to the (first) one side in the circumferential direction. The outer wall surface part 264*c* extends from an end of the outer wall surface part 264*b* on the one (first) side in the axial direction while being inclined toward the other (second) side in the axial direction and the other (second) side in the circumferential direction. The outer wall surface part 264*e* extends from an end of the outer wall surface part 264*d* on the other (second) side in the axial direction while being inclined toward the other (second) side in the axial direction and the one (first) side in the circumferential direction.

The projection 270 is formed on (at) the side of the side surface 214 (the other (second) side in the circumferential direction) on (at) the side of the end surface 211 (the one (first) side in the axial direction) of the through hole 240. The projection 270 has outer wall surfaces 271 to 274. The outer wall surface 271 is formed on the radially outer side and extends in the circumferential direction and the axial direction. The outer wall surface 272 is formed on the other (second) side in the axial direction and extends in the circumferential direction and the radial direction. The outer wall surface 273 is formed on the one (first) side in the circumferential direction (the side facing the projection 260) and extends in the axial direction. The outer wall surface 274 is formed on the other (second) side in the circumferential direction (the side facing away from the projection 260) and extends in the axial direction. Further, an outer wall surface of the projection 270 on the one (first) side in the axial direction is formed by the end surface 211 of the first flange 210.

The outer wall surface 274 has a first outer wall surface part 274*a* and a second outer wall surface part 274*b* in order in the direction extending from the one (first) side to the other (second) side in the axial direction. The first outer wall surface part 274*a* extends in parallel to the axial direction. The second outer wall surface part 274*b* extends from an end of the first outer wall surface part 274*a* on the other (second) side in the axial direction while being inclined toward the other (second) side in the circumferential direction and the other (second) side in the axial direction. An end of the second outer wall surface part 274*b* on the other (second) side in the axial direction is connected to the outer wall surface 272.

Further, a locking projection 277 is provided on (at) the first outer wall surface part 274*a* of the projection 270 and protrudes toward the other (second) side in the circumferential direction. The locking projection 277 has a projection 278 that is formed on (at) its end part on the other (second) side in the circumferential direction and protrudes toward the other (second) side in the axial direction. An end of each of the stator windings 610 is fixed by the locking projection 277. Further, a working space for fixing the end of the stator winding 610 is secured (ensured, provided) by a space 265 above the outer wall surface part 264*b* of the outer wall surface 264 and by a space 275 above the outer wall surface part 274*b* of the outer wall surface 274.

The first flange 210 further has recessed parts 280 and 290 that are recessed radially inward from the outer peripheral surface 210A.

The recessed part 280 is formed on (at) the side of the side surface 213 (the one (first) side in the circumferential direction) of the through hole 240 and is open to the one (first) side in the circumferential direction, to the other (second) side in the axial direction and radially outwardly.

The recessed part 280 is defined by a bottom surface 281*a*, the outer wall surface 262 and a side surface 281*b*. The outer wall surface 262 is formed on (at) the one (first) side of the bottom surface 281*a* in the axial direction, and the side surface 281*b* is formed on (at) the other (second) side of the bottom surface 281*a* in the circumferential direction. The bottom surface 281*a* of the recessed part 280 is a flat surface extending in the axial direction and the circumferential direction.

The recessed part 290 is formed on (at) on the side of the side surface 214 (the other (second) side in the circumferential direction) of the through hole 240 and is open to the other (second) side in the circumferential direction, to the other (second) side in the axial direction and radially outwardly.

The recessed part 290 is defined by a bottom surface 291*a*, the outer wall surface 272 and a side surface 291*b*. The outer wall surface 272 is formed on (at) the one (first) side of the bottom surface 291*a* in the axial direction, and the side surface 291*b* is formed on (at) the one (first) side of the bottom surface 291*a* in the circumferential direction. The bottom surface 291*a* of the recessed part 290 is a flat surface extending in the axial direction and the circumferential direction.

As further described below (see FIGS. 27 and 28 and the description below concerning these drawings), the position of one end of each of the winding insulation members 310 on the other (second) side in the circumferential direction is restricted (limited, blocked) on the other (second) side in the circumferential direction and on the one (first) side in the axial direction by the recessed part 280. The position of the other end of the winding insulation member 310 on the one (first) side in the circumferential direction is restricted (limited, blocked) on the one (first) side in the circumferential direction and on the one (first) side in the axial direction by the recessed part 290.

The recessed parts 280 and 290 (see e.g., FIGS. 4 and 5) correspond to non-limiting embodiments of a "first recessed part of the first insulator" and a "second recessed part of the first insulator" according to this disclosure, respectively.

Further, as shown in FIG. 5, the first flange 210 has locking surfaces 213*a* and 214*a* that restrict (limit, block) movement of the winding insulation member 310 toward the other (second) side in the axial direction.

In this embodiment, a projection 213A is formed on (at) a lower part of the side surface 213 in the axial direction. The locking surface 213*a* is formed on (at) an end of the projection 213A on the one (first) side in the axial direction and extends from the side surface 213 to the one (first) side in the circumferential direction. Further, a projection 214A is formed (at) on a lower part of the side surface 214 in the axial direction. The locking surface 214*a* is formed on an end of the projection 214A on the one (first) side in the axial direction and extends from the side surface 214 to the other (second) side in the circumferential direction. The locking surfaces 213*a* and 214*a* will be described below in further detail.

The locking surfaces 213*a* and 214*a* of the (locking) projections 213A, 214A, respectively, (see e.g., FIG. 5) correspond to non-limiting embodiments of a "first movement restriction part (projection) of the first insulator" and a "second movement restriction part (projection) of the first insulator" according to this disclosure, respectively.

As shown in FIGS. 6 and 7, the second flange 220 has a projection 221 that protrudes radially inward from the inner peripheral surface 220B. In this embodiment, the inner peripheral surface 220B is a flat surface extending in the circumferential direction and the radial direction. The inner peripheral surface 220B has an inner peripheral surface part 220B1 formed on the other (second) side of the through hole 240 in the axial direction.

The projection 221 has a radially-inward end surface 221A, an outer wall surface 221A1 on the one (first) side in the circumferential direction, an outer wall surface 221A2 on the other (second) side in the circumferential direction and an outer wall surface 225 on the other (second) side in the axial direction. An outer wall surface of the projection 221 on the one (first) side in the axial direction is formed by the end surface 227 of the second flange 210.

The projection 221 has projections 221B and 221C and a projection piece (projection shoulder) 226A on the one (first) side in the axial direction.

The projection 221B protrudes from the projection 221 (the outer wall surface 221A1) toward the one (first) side in the circumferential direction. The projection 221B has an end surface 221B1 on the other (second) side in the axial direction. The end surface 221B1 is provided continuously to (with) the outer wall surface 221A1 of the projection 221 and extends in the circumferential direction and the radial direction.

The projection 221C protrudes from the projection 221 (the outer wall surface 221A2) toward the other (second) side in the circumferential direction. The projection 221C has an end surface 221C1 on the other (second) side in the axial direction. The end surface 221C1 is provided continuously to (with) the outer wall surface 221A2 of the projection 221 and extends in the circumferential direction and the radial direction.

The projection piece 226A protrudes radially inward from the projection 221 (the end surface 221A).

Further, the second flange 220 has a projection 226C protruding from the end surface 227 toward the one (first) side in the axial direction. The projection 226C has a projection 226B that protrudes radially inward.

The second flange 220 has (first and second) overlapping parts 220E and 220F.

As shown in FIGS. 6, 8 and 9, the (first) overlapping part 220E is provided on the one (first) side of the through hole 240 in the circumferential direction and extends in the axial direction and the circumferential direction.

The overlapping part 220E is defined by an inner peripheral surface part, the side surface 223 and an outer peripheral surface part.

The inner peripheral surface part has a first inner peripheral surface part 220B21, a second inner peripheral surface part 220B22 and a third inner peripheral surface part 220B2 in order in the direction extending from the side of the inner wall surface 243 of the through hole 240 to the side surface 223.

The second inner peripheral surface part 220B22 extends radially outward from the first inner peripheral surface part 220B21 and forms a stepped surface.

The third inner peripheral surface part 220B2 extends from the second inner peripheral surface part 220B22 to the side surface 223 in the circumferential direction. The third inner peripheral surface part 220B2 is inclined radially inward toward the side of the side surface 223. As shown in FIG. 9, an angle (denoted by s1) is defined between an extending direction (shown by a broken line) of the third inner peripheral surface part 220B2 and an extending direction of a center line 200Ap (shown by a short-dash/long-dash line) of the first insulator 200A in the circumferential direction and is preferably less than 90 degrees.

The second inner peripheral surface part 220B22 is formed continuously to (with) the outer wall surface 221A1 of the projection 221. Thus, a recessed part (a recess) is defined by the third inner peripheral surface part 220B2, the second inner peripheral surface part 220B22, the outer wall surface 221A1 of the projection 221 and the end surface 221B1 of the projection 221B and is recessed radially outward from the inner peripheral surface 220B.

The outer peripheral surface part has a first outer peripheral surface part 220B23, a second outer peripheral surface part 220B24 and a third outer peripheral surface part 220B25 in order in the direction extending from the side of the side surface 223 to the body 230.

The first outer peripheral surface part 220B23 extends from the side surface 223 toward the other (second) side in the circumferential direction.

The second outer peripheral surface part 220B24 extends radially outward from the first outer peripheral surface part 220B23.

The third outer peripheral surface part 220B25 extends from the second outer peripheral surface part 220B24 toward the other (second) side in the circumferential direction. The third outer peripheral surface part 220B25 extends orthogonally (or substantially orthogonally) toward the center line 200Ap of the first insulator 200A in the circumferential direction.

The first outer peripheral surface part 220B23 and the second outer peripheral surface part 220B24 define a portion of a recessed part (described below) in which a tip end part of a central part of the winding insulation member 310 is inserted (see FIG. 24). The other portion of the recessed part is defined by the second insulator 200B (described below).

In this embodiment, the overlapping part 220E and the third inner peripheral surface part 220B2 (see e.g., FIG. 9) correspond to non-limiting embodiments of a "first overlapping part" and a "first overlapping face extending in the axial direction and the circumferential direction" according to this disclosure, respectively.

The third inner peripheral surface part 220B2, the second inner peripheral surface part 220B22, the outer wall surface 221A1 of the projection 221 and the end surface 221B1 of the projection 221B (see e.g., FIGS. 6, 8 and 9) define a non-limiting embodiment of a "recessed part in which the overlapping part is arranged (disposed)" according to this disclosure.

The end surface 221B1 of the projection 221B (see e.g., FIGS. 6, 8 and 9) corresponds to a non-limiting embodiment of a "second abutment part that restricts (blocks, limits) the position of the overlapping part on the one (first) side in the axial direction" according to this disclosure. The outer wall surface 221A1 of the projection 221 and the second inner peripheral surface part 220B22 (see e.g., FIG. 6) correspond to a non-limiting embodiment of a "first abutment part that restricts (blocks, limits) the position of the overlapping part on the other (second) side in the circumferential direction" according to this disclosure.

The first outer peripheral surface part 220B23 and the second outer peripheral surface part 220B24 (see e.g., FIG. 9) define a non-limiting embodiment of "a part (portion) of a recessed part (recessed part N1 shown in FIG. 24) formed radially outward of the side surface of the first flange" according to this disclosure.

As shown in FIGS. 6, 8 and 10, the overlapping part 220F is provided on the other (second) side of the through hole 240 in the circumferential direction and extends in the axial direction and the circumferential direction.

Relative to the center line 200Ap of the first insulator 200A, the overlapping part 220F is formed in a mirror symmetrical manner in the circumferential direction with respect to the overlapping part 220E. Thus, the one (first) side and the other (second) side of the overlapping part 220F in the circumferential direction are reversed from those of the overlapping part 220E. Otherwise, the overlapping part 220F has the same structure as the overlapping part 220E, and is therefore not described in detail.

In this embodiment, the overlapping part 220F and a third inner peripheral surface part 220B3 (see e.g., FIG. 10) correspond to non-limiting embodiments of a "second overlapping part" and a "second overlapping face extending in the axial direction and the circumferential direction" according to this disclosure, respectively.

The third inner peripheral surface part 220B3, a second inner peripheral surface part 220B32, the outer wall surface 221A2 of the projection 221 and the end surface 221C1 of the projection 221C (see e.g., FIG. 6) define a non-limiting embodiment of a "recessed part in which the overlapping part is arranged (disposed)" according to this disclosure.

The end surface 221C1 of the projection 221C (see e.g., FIGS. 6 and 8) corresponds to a non-limiting embodiment of a "second abutment part that restricts (blocks, limits) the position of the overlapping part on the one (first) side in the axial direction" according to this disclosure. The outer wall surface 221A2 of the projection 221 and the second inner peripheral surface part 220B32 (see e.g., FIG. 6) correspond to a non-limiting embodiment of a "first abutment part that restricts (blocks, limits) the position of the overlapping part on the one (first) side in the circumferential direction" according to this disclosure.

The first outer peripheral surface part 220B33 and the second outer peripheral surface part 220B34 (see e.g., FIG. 10) define a non-limiting embodiment of "a part (portion) of a recessed part (recessed part N2 shown in FIG. 25) formed radially outward of the side surface of the first flange" according to this disclosure.

Figure 12:
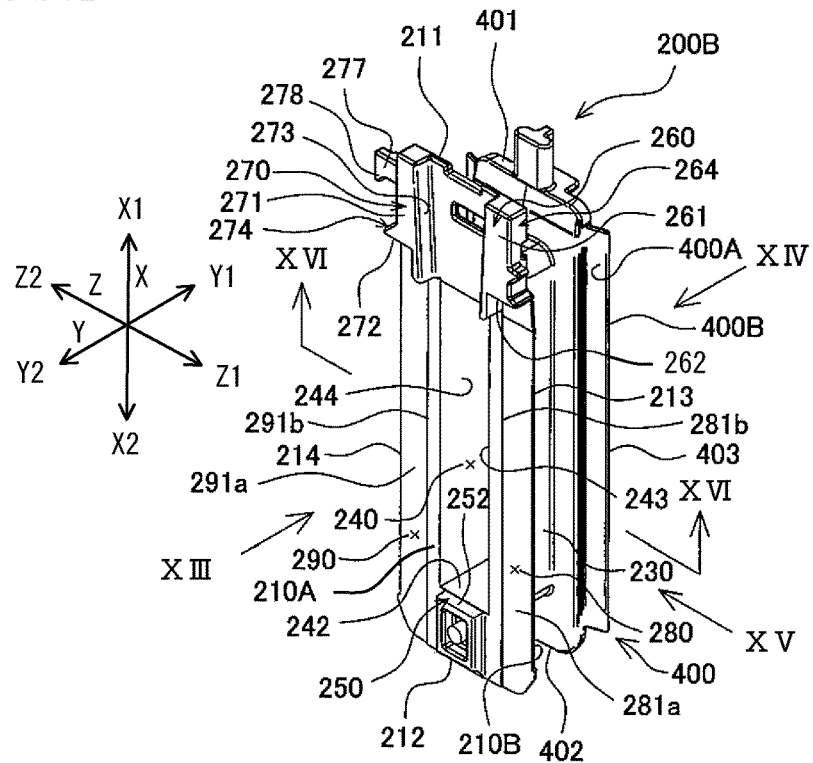
FIG. 12 is a perspective view of a second insulator of the stator of the embodiment.
Figure 14:
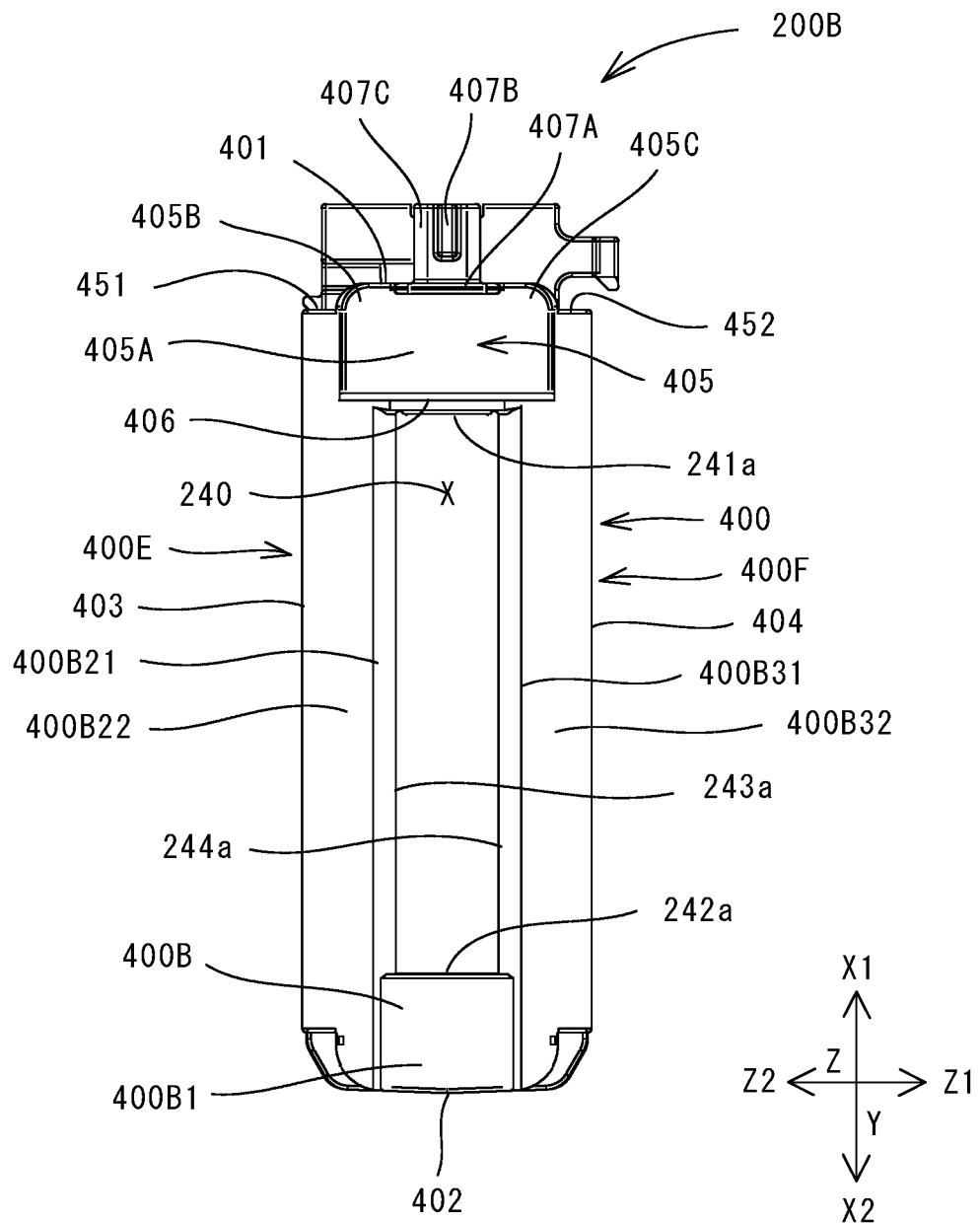
FIG. 14 shows the second insulator as viewed from the direction of arrow XIV in FIG.
Figure 15:
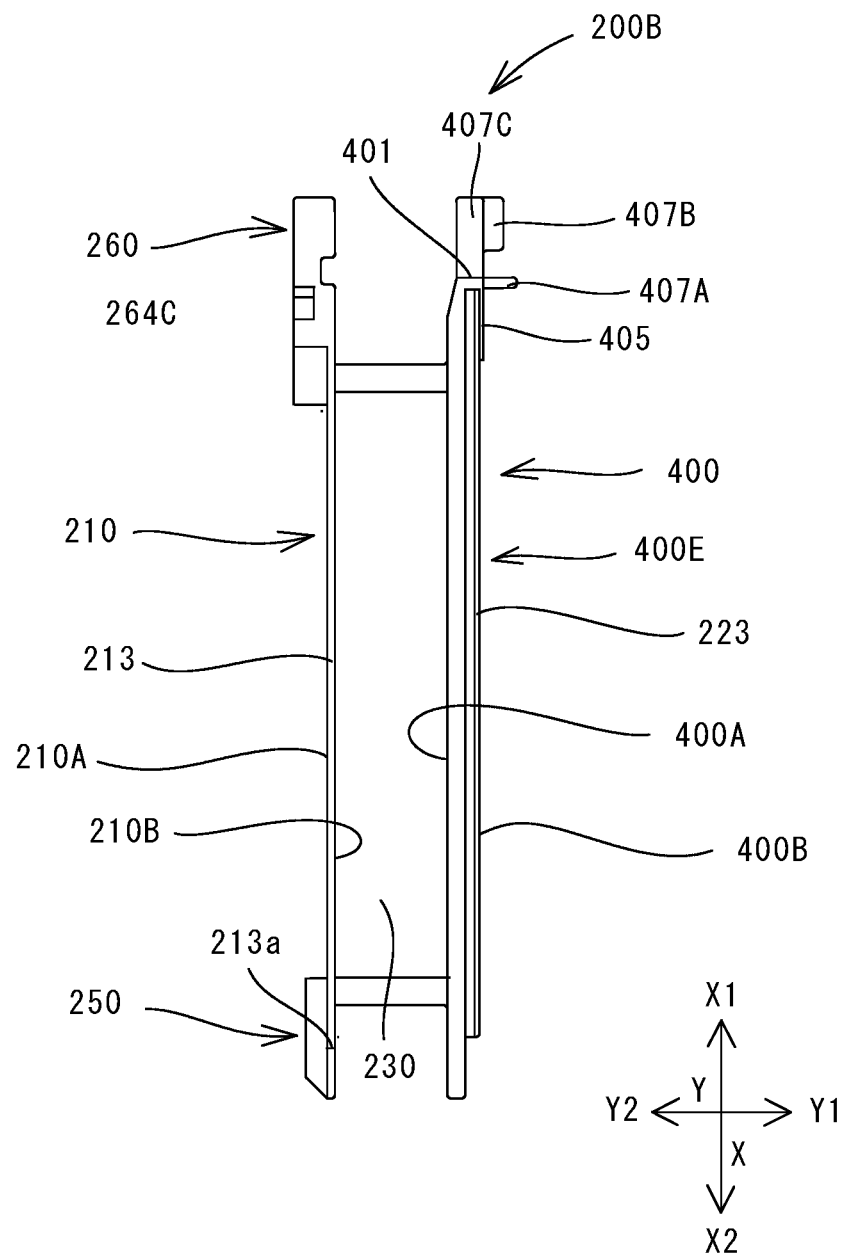
FIG. 15 shows the second insulator as viewed from the direction of arrow XV in FIG.
Figure 16:
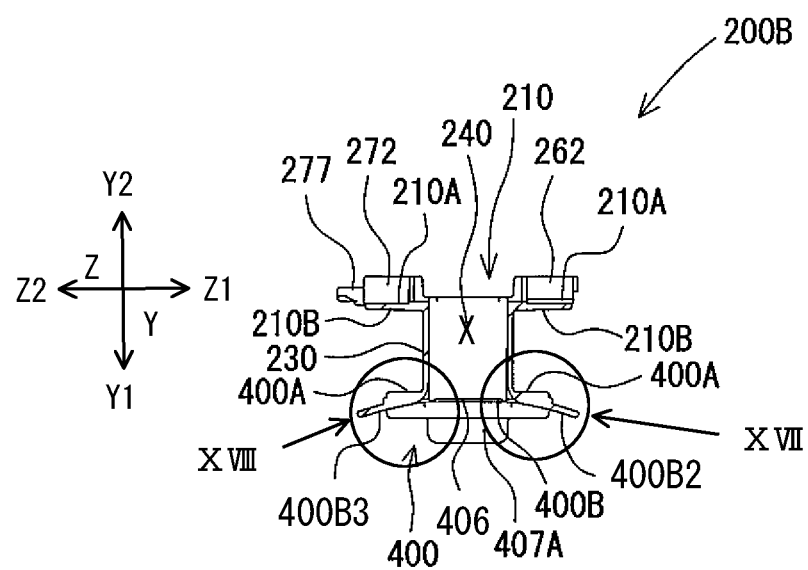
FIG. 16 is a sectional view taken along line XVI-XVI in FIG. 12.
Figure 17:
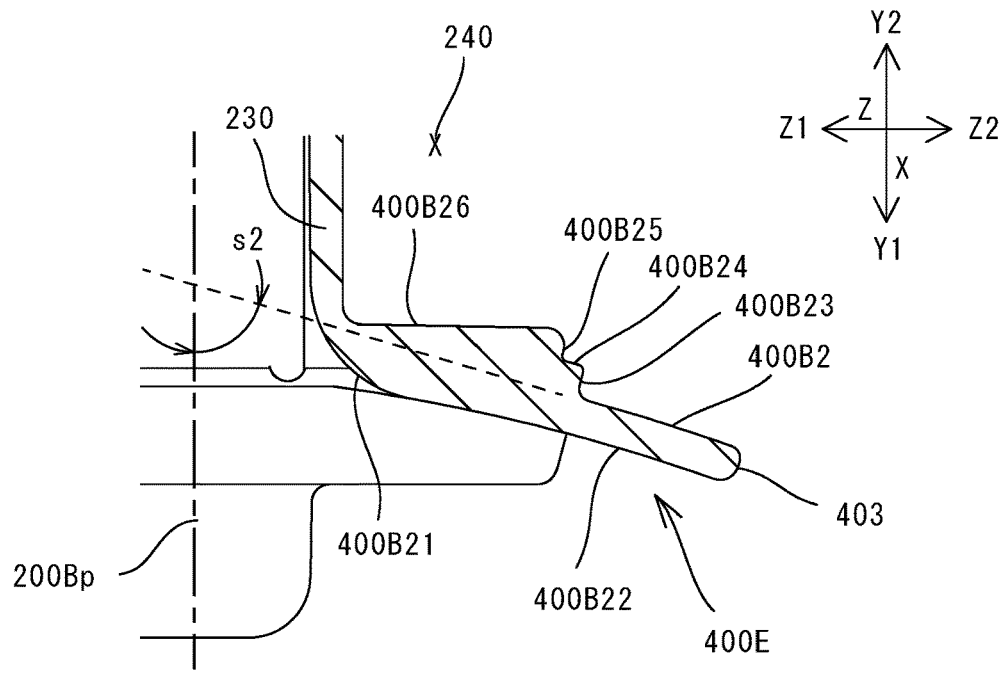
FIG. 17 is an enlarged view of the region within the circle indicated by arrow XVII in FIG. 16.
Figure 18:
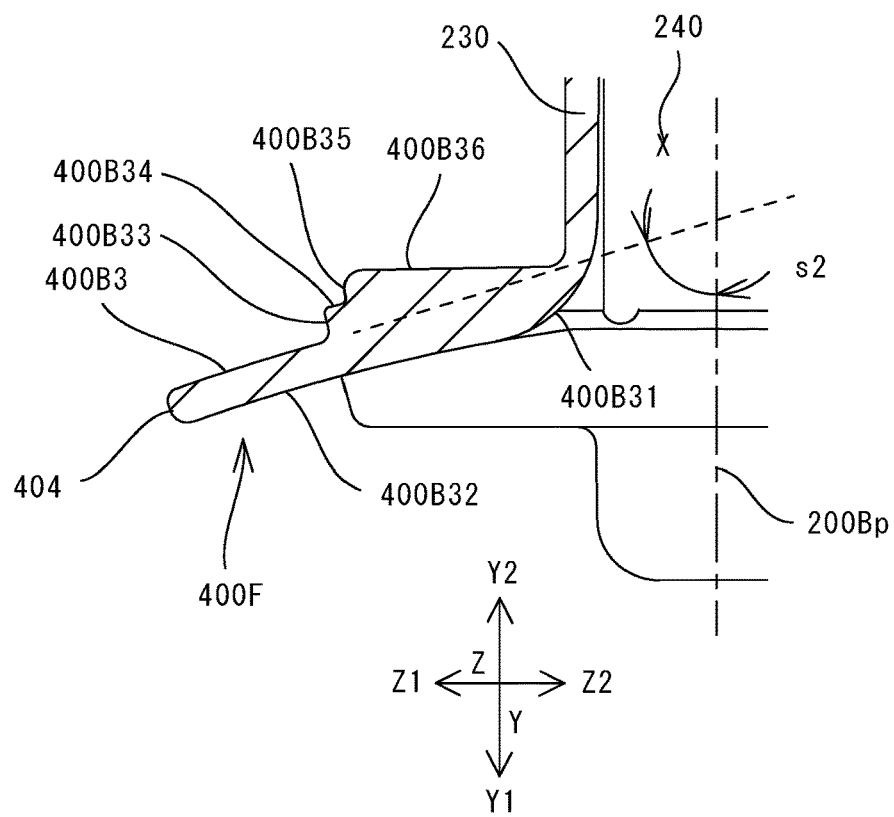
FIG. 18 is an enlarged view of the region within the circle indicated by arrow XVIII in FIG. 16.

A representative example of the second insulators 200B is now described with reference to FIGS. 12 to 18. All of the second insulators 200B in the insulator assembly 200 preferably have the same shape, dimensions, etc.; i.e. all of the second insulators 220B are preferably identical in construction. FIG. 12 is a perspective view of the second insulator 200B. FIG. 13 shows the second insulator 200B as viewed from the direction of arrow XIII in FIG. 12 (from the radially inward direction). FIG. 14 shows the second insulator 200B as viewed from the direction of arrow XIV in FIG. 12 (from the radially inward direction). FIG. 15 shows the second insulator 200B as viewed from the direction of arrow XV in FIG. 12 (from the one side in the circumferential direction). FIG. 16 is a sectional view taken along line XVI-XVI in FIG. 12. FIGS. 17 and 18 are enlarged views of the regions in circles indicated by arrows XVII and XVIII in FIG. 16, respectively.

Like the first insulator 200A, the second insulator 200B is formed (composed) of a resin (polymer) having electrical insulating properties, e.g., the same polymer as the first insulator 200A.

Like the first insulator 200A, the second insulator 200B has a first flange 210, a second flange 400 and a body 230.

The first flange 210 and the body 230 of the second insulator 200B respectively have the same structures as the first flange 210 and the body 230 of the first insulator 200A and are therefore not described.

In this embodiment, the recessed parts 280 and 290 of the first flange 210 (see e.g., FIGS. 12 and 13) correspond to non-limiting embodiments of a "first recessed part of the second insulator" and a "second recessed part of the second insulator" according to this disclosure, respectively.

Further, the locking surfaces 213a and 214a of the (locking projections) 213A, 214A of the first flange 210 (see e.g., FIG. 13) correspond to non-limiting embodiments of a "first movement restriction part (projection) of the second insulator" and a "second movement restriction part (projection) of the second insulator" according to this disclosure, respectively.

As can be seen, e.g., in FIGS. 12 and 15, the second flange 400 is arranged (disposed) radially inward of the first flange 210 and extends in the axial direction and the circumferential direction. The second flange 400 has a radially-outer peripheral surface 400A, a radially-inner peripheral surface 400B, an (a first) end surface 401 on the one (first) side in the axial direction, an (a second) end surface 402 on the other (second) side in the axial direction, a (first) side surface 403 on the one (first) side in the circumferential direction and a (second) side surface 404 on the other (second) side in the circumferential direction.

As shown in FIGS. 14 and 15, the second flange 400 has a projection 405 that protrudes radially inward from the inner peripheral surface 400B. In this embodiment, the inner peripheral surface 400B is a flat surface extending in the circumferential direction and the radial direction. The inner peripheral surface 400B has an inner peripheral surface part 400B1 formed on the other (second) side of the through hole 240 in the axial direction.

The projection 405 has an end surface 405A that is disposed radially inward, an outer wall surface 405A1 on the one (first) side in the circumferential direction, an outer wall surface 405A2 on the other (second) side in the circumferential direction and an outer wall surface 406 on the other (second) side in the axial direction. An outer wall surface of the projection 405 on the one (first) side in the axial direction is formed by the end surface 401 of the second flange 400.

The projection 405 has, on one side in the axial direction, a projection piece (shoulder) 407A, and circular arc parts 405B and 405C on the opposite sides in the circumferential direction.

The projection piece 407A protrudes radially inward from the projection 405 (the end surface 405A).

Further, the second flange 400 has a projection 407C protruding from the end surface 401 toward the one side in the axial direction. The projection 407C has a projection 407B that protrudes radially inward.

The second flange 400 has (first and second) overlapping parts 400E and 400F.

As shown in FIGS. 14, 16 and 17, the (first) overlapping part 400E is provided on the one (first) side of the through hole 240 in the circumferential direction and extends in the axial direction and the circumferential direction.

The overlapping part 400E is defined by an inner peripheral surface part, the side surface 403 and an outer peripheral surface part.

The inner peripheral surface part has a first inner peripheral surface part 400B21 and a second inner peripheral surface part 400B22 in order in the direction extending from the side of the inner wall surface 243 of the through hole 240 to the side surface 403.

The overlapping part 400E has an (a first) end surface 451 (see FIG. 14) on the one (first) side in the axial direction. In the insulator assembly 200, the position of the overlapping part 220F of the first insulator 200A on the one (first) side in the axial direction is restricted (limited, bounded) by abutment of the end surface 451 of the overlapping part 400E on the end surface 221C1 of the overlapping part 220F, as can be understood, e.g., from FIGS. 22 and 23.

As can be seen, e.g., in FIGS. 14 and 17, the second inner peripheral surface part 400B22 extends from the first inner peripheral surface part 400B21 to the side surface 403 in the circumferential direction. The second inner peripheral surface part 400B22 is inclined radially inward toward the side of the side surface 403. The second inner peripheral surface part 400B22 extends in parallel (or substantially in parallel) to a first outer peripheral surface part 400B2.

The outer peripheral surface part has the first outer peripheral surface part 400B2, a second outer peripheral surface part 400B23, a third outer peripheral surface part 400B24, a fourth outer peripheral surface part 400B25 and a fifth outer peripheral surface part 400B26, in order in the direction extending from the side surface 403 to the body 230.

The first outer peripheral surface part 400B2 extends from the side surface 403 toward the other (second) side in the circumferential direction. The first outer peripheral surface part 400B2 is inclined radially inward toward the side of the side surface 403. As shown in FIG. 17, an angle (denoted as angle s2) is defined between an extending direction (shown by a broken line) of the first outer peripheral surface part 400B2 and an extending direction of a center line 200Bp (shown by a long-dash/short-dash line) of the second insulator 200B in the circumferential direction and is preferably less than 90 degrees. The second inner peripheral surface part 400B22 extends in parallel (or substantially in parallel) to the first outer peripheral surface part 400B2.

The second outer peripheral surface part 400B23 extends radially outward from the first outer peripheral surface part 400B2. The third outer peripheral surface part 400B24 extends from the second outer peripheral surface part 400B23 toward the other (second) side in the circumferential direction. The fourth outer peripheral surface part 400B25 extends radially outward from the third outer peripheral surface part 400B24.

The fifth outer peripheral surface part 400B26 extends from the fourth outer peripheral surface part 400B25 toward the other (second) side in the circumferential direction. The fifth outer peripheral surface part 400B26 extends orthogonally (or substantially orthogonally) to the center line 200Bp of the second insulator 200B in the circumferential direction.

The second outer peripheral surface part 400B23 is configured to abut on the side surface 224 of the second flange 220 of the first insulator 200A as described below, thereby restricting (blocking, limiting) movement of the first insulator 200A toward the other (second) side in the circumferential direction.

The third outer peripheral surface part 400B24 and the fourth outer peripheral surface part 400B25 define a portion of a recessed part N2 (see FIG. 25) in which a tip end part of a central part of the winding insulation member 310 is inserted as described below. Thus, this portion of the recessed part N2 is formed radially outward of the side surface 224 of the first insulator 200A, which abuts on the second outer peripheral surface part 400B23. The other portion of the recessed part N2 is defined by the first insulator 200A.

In this embodiment, the overlapping part 400E and the first outer peripheral surface part 400B2 (see e.g., FIG. 17) correspond to non-limiting embodiments of a "third overlapping part" and a "third overlapping face extending in the axial direction and the circumferential direction" according to this disclosure, respectively.

The second outer peripheral surface part 400B23 (see e.g., FIG. 17) corresponds to a non-limiting embodiment of an "abutment part that restricts (blocks, limits) the position of the second overlapping part on the other (second) side in the circumferential direction" according to this disclosure.

The third outer peripheral surface part 400B24 and the fourth outer peripheral surface part 400B25 (see e.g., FIG. 17) define a non-limiting embodiment of a "recessed part formed radially outward of the side surface of the second overlapping part" (the recessed part N2 shown in FIG. 25) according to this disclosure. The third outer peripheral surface part 400B24 and the fourth outer peripheral surface part 400B25 also correspond to a non-limiting embodiment of a "recess forming face that defines a part of a recessed part" according to this disclosure.

As shown in FIGS. 14, 16, 18 and 19, the (second) overlapping part 400F is provided on the other (second) side of the through hole 240 in the circumferential direction and extends in the axial direction and the circumferential direction.

Relative to the center line 200Bp of the second insulator 200B, the overlapping part 400F is formed in a mirror symmetric manner in the circumferential direction with respect to the overlapping part 400E. Thus, the one (first) side and the other (second) side of the overlapping part 400F in the circumferential direction are reversed from those of the overlapping part 400E. Otherwise, the overlapping part 400F has the same structure as the overlapping part 400E, and is therefore not described in detail.

The overlapping part 400F has an end surface 452 on the one (first) side in the axial direction, as can be seen, e.g., in FIG. 14. In the insulator assembly 200, the position of the overlapping part 220E of the first insulator 200A) on the one (first) side in the axial direction is restricted (limited, bounded) by abutment of the end surface 452 of the overlapping part 400F on the end surface 221B1 of the overlapping part 220E, as can be seen, e.g., in FIGS. 22 and 23.

In this embodiment, the overlapping part 400F and the first outer peripheral surface part 400B3 (see e.g., FIG. 18) correspond to non-limiting embodiments of a "fourth overlapping part" and a "fourth overlapping face extending in the axial direction and the circumferential direction" according to this disclosure, respectively.

A second outer peripheral surface part 400B33 (see e.g., FIG. 18) corresponds to a non-limiting embodiment of an "abutment part that restricts (blocks, limits) the position of the first overlapping part on the one side in the circumferential direction" according to this disclosure.

A third outer peripheral surface part 400B34 and a fourth outer peripheral surface part 400B35 (see e.g., FIG. 18) define a non-limiting embodiment of a "recessed part formed radially outward of the side surface of the first overlapping part" according to this disclosure. The third outer peripheral surface part 400B34 and the fourth outer peripheral surface part 400B35 also correspond to a non-limiting embodiment of a "recess forming face that defines a part of the recessed part" according to this disclosure.

The first insulators 200A are fitted onto respective ones of the teeth 121 (in particular, on the tooth base part 122 thereof) of the first core member 120 as shown in FIG. 11.

Figure 19:
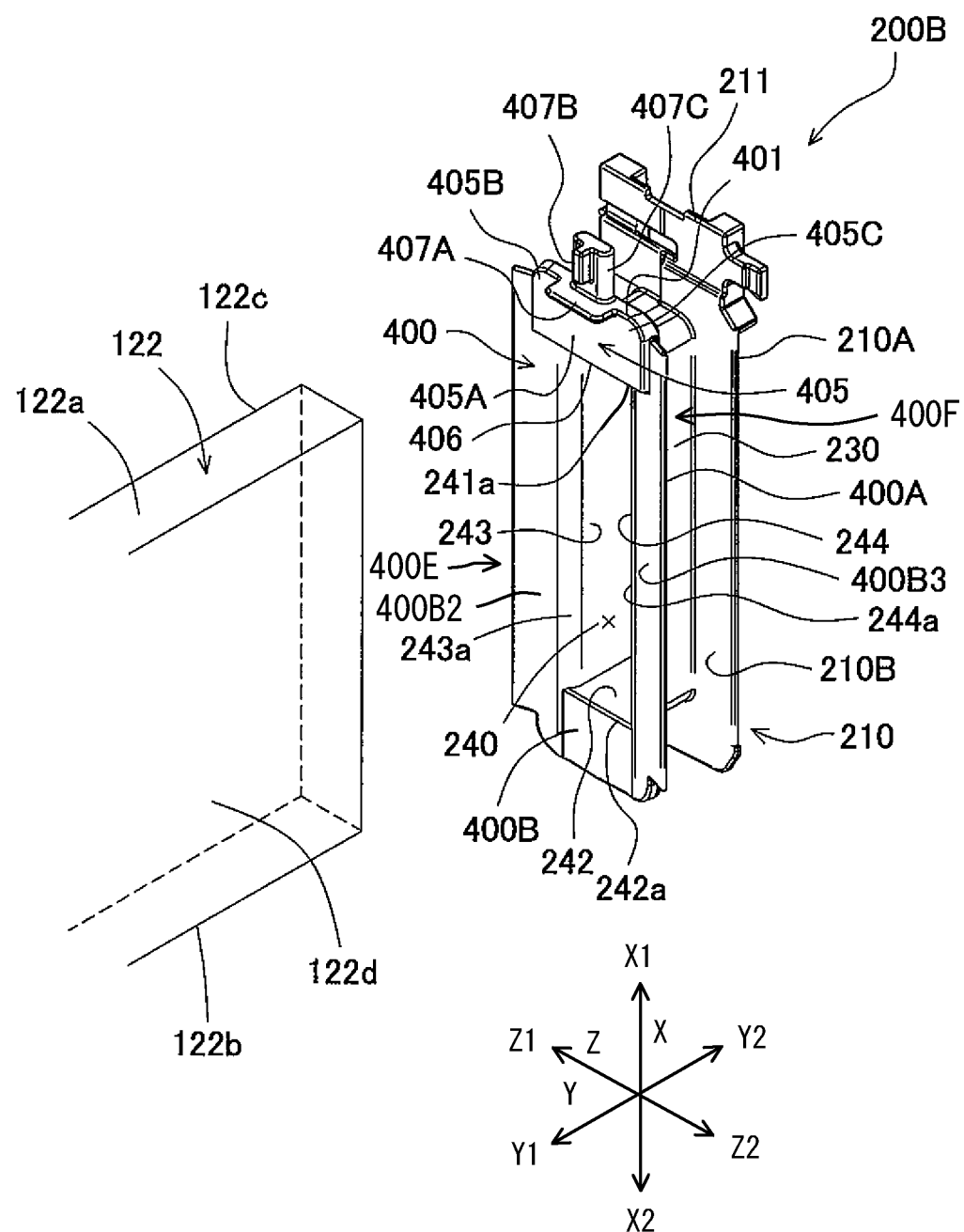
FIG. 19 is a drawing for illustrating how to mount a second insulator onto a tooth.

The second insulators 200B are fitted onto respective other ones of the teeth 121 (again, on the tooth base part 122 thereof) of the first core member 120 as shown in FIG. 19.

The end part of the tooth base part 122 is inserted into the respective through hole 240 from the side of the second flange 220 or the second flange 400.

One exemplary method for fitting the first and second insulators 200A, 200B onto the respective teeth 121 (i.e. on the tooth base parts 122 thereof) of the first core member 120 is now described with reference to FIGS. 20 to 25.

As shown in FIG. 20, the second insulators 200B are first fitted onto the teeth 121, and thereafter the first insulators 200A are fitted onto the teeth 121. The first insulators 200A and the second insulators 200B are arranged in an alternating manner (sequence) in the circumferential direction.

Figure 22:
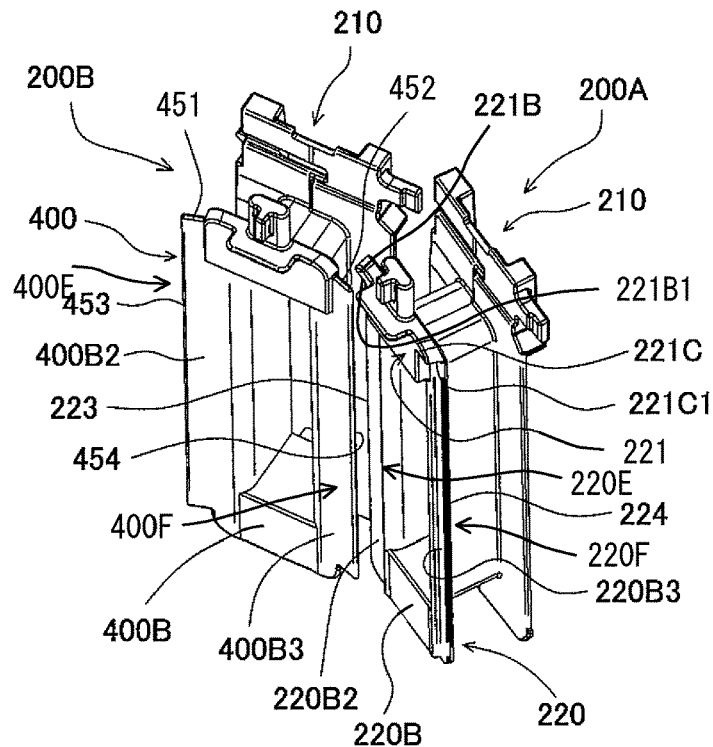
FIG. 22 is a drawing for illustrating how to arrange the first and second insulators adjacent to each other.
Figure 23:
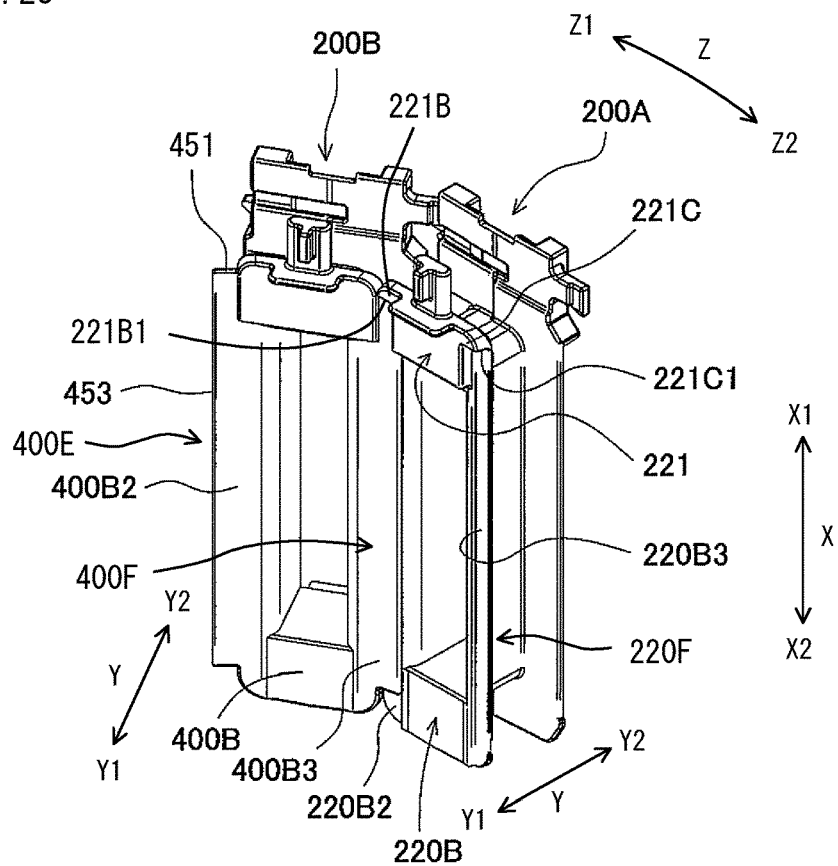
FIG. 23 is a perspective view of the first and second insulators arranged adjacent to each other as viewed from inside in a radial direction.

For example, as shown in FIG. 22, the third inner peripheral surface part 220B2 of the overlapping part 220E of the first insulator 200A is placed radially outward of a first outer peripheral surface part 400B3 of the overlapping part 400F of the second insulator 200B. Then, as shown in FIG. 23, the overlapping part 220E is moved toward the one (first) side in the axial direction until the end surface 452 of the overlapping part 400F abuts on the end surface 221B1 of the overlapping part 220E while the side surface 404 of the overlapping part 400F abuts on the second inner peripheral surface part 220B22 of the overlapping part 220E.

Figure 21:
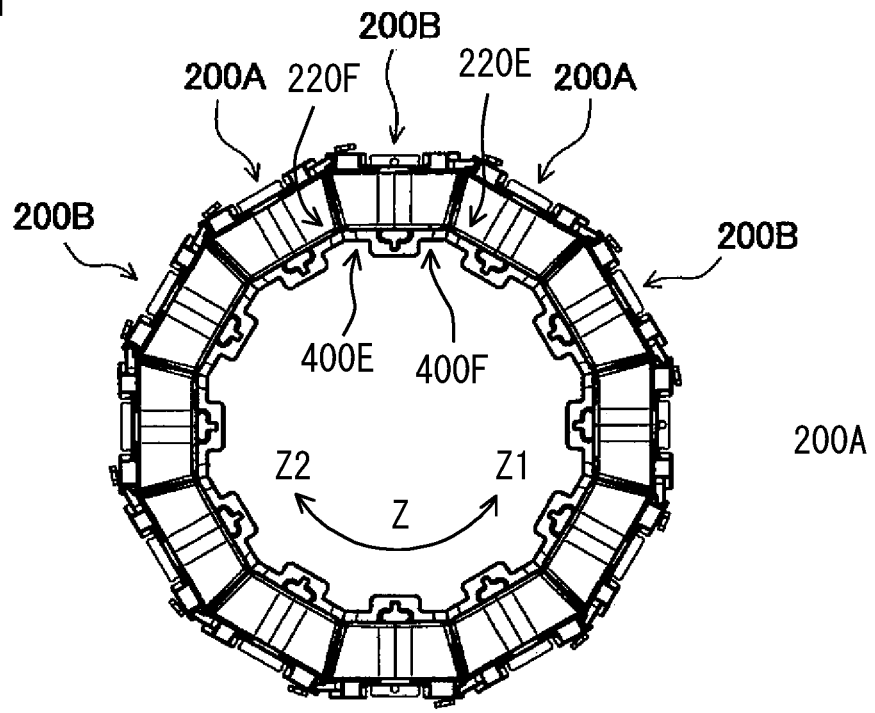
FIG. 21 shows the first and second insulators mounted to (on) the first core member of the stator core.

Thus, as shown in FIG. 21, the first insulators 200A and the second insulators 200B are fitted onto the teeth 121 of the first core member 120 in an alternating arrangement/manner in the assembled state of the insulator assembly 200.

An angle formed between the extending direction of the center line of one of the insulators in the circumferential direction and the extending direction of the overlapping face thereof is set such that an open angle between the adjacent insulators (e.g., a first insulator 220A adjacent to a second insulator 220B) corresponds to an open angle between two teeth that are adjacent in the circumferential direction when (in the state in which) the overlapping faces of first and second insulators 220A, 220B are overlapped with each other, i.e. in the assembled state of the insulator assembly 200.

This is now described in further detail with reference to FIG. 24.

When adjacent overlapping parts 220E and 400F are overlapped (superimposed, overlaid) with each other, the third inner peripheral surface part 220B2 (overlapping face) of the overlapping part 220E overlaps the first outer peripheral surface part 400B3 (overlapping face) of the overlapping part 400F. In FIG. 24, the third inner peripheral surface part 220B2 (overlapping face) of the overlapping part 220E (of a first insulator 220A) is arranged (disposed) radially outward of the first outer peripheral surface part 400B3 (overlapping face) of the overlapping part 400F (of a second insulator 220B).

An open angle T (see FIG. 3) between the adjacent insulators corresponds to an angle S (see FIG. 24) between the center line 200Ap of the first insulator 200A in the circumferential direction and the center line 200Bp of the second insulator 200B adjacent to the first insulator 200A in the circumferential direction when (in the state in which) adjacent first and second insulators 200A and 200B are fitted onto adjacent teeth 121. As shown in FIG. 3, the open angle T of the teeth is an angle formed between center lines in the circumferential direction of adjacent ones of the teeth 121 in the circumferential direction.

When viewed from the one (first) side in the axial direction (see FIG. 24), an angle (denoted as s1) is defined between the extending direction of the center line 200Ap (shown by a long-dash/short-dash line) of the first insulator 200A in the circumferential direction and an extension line (shown by a broken line) of the overlapping face 220B2 of the overlapping part 220E. An angle (denoted as s2) is defined between the extending direction of the center line 200Bp (shown by a long-dash/short-dash line) of the second insulator 200B and an extension line (shown by a broken line) of the overlapping face 400B3 of the overlapping part 400F.

In this embodiment, the sum of the angle s1 and the angle s2 is set to a setting angle corresponding to the open angle T of the teeth 121. The setting angle is preferably at least substantially equal to the open angle T. The angle s1 and the angle s2 are each preferably at least substantially equal to one-half of the open angle T. The angle s1 and the angle s2 may be each equal to one-half of the open angle T; i.e. s1+s2=T.

Figure 24:
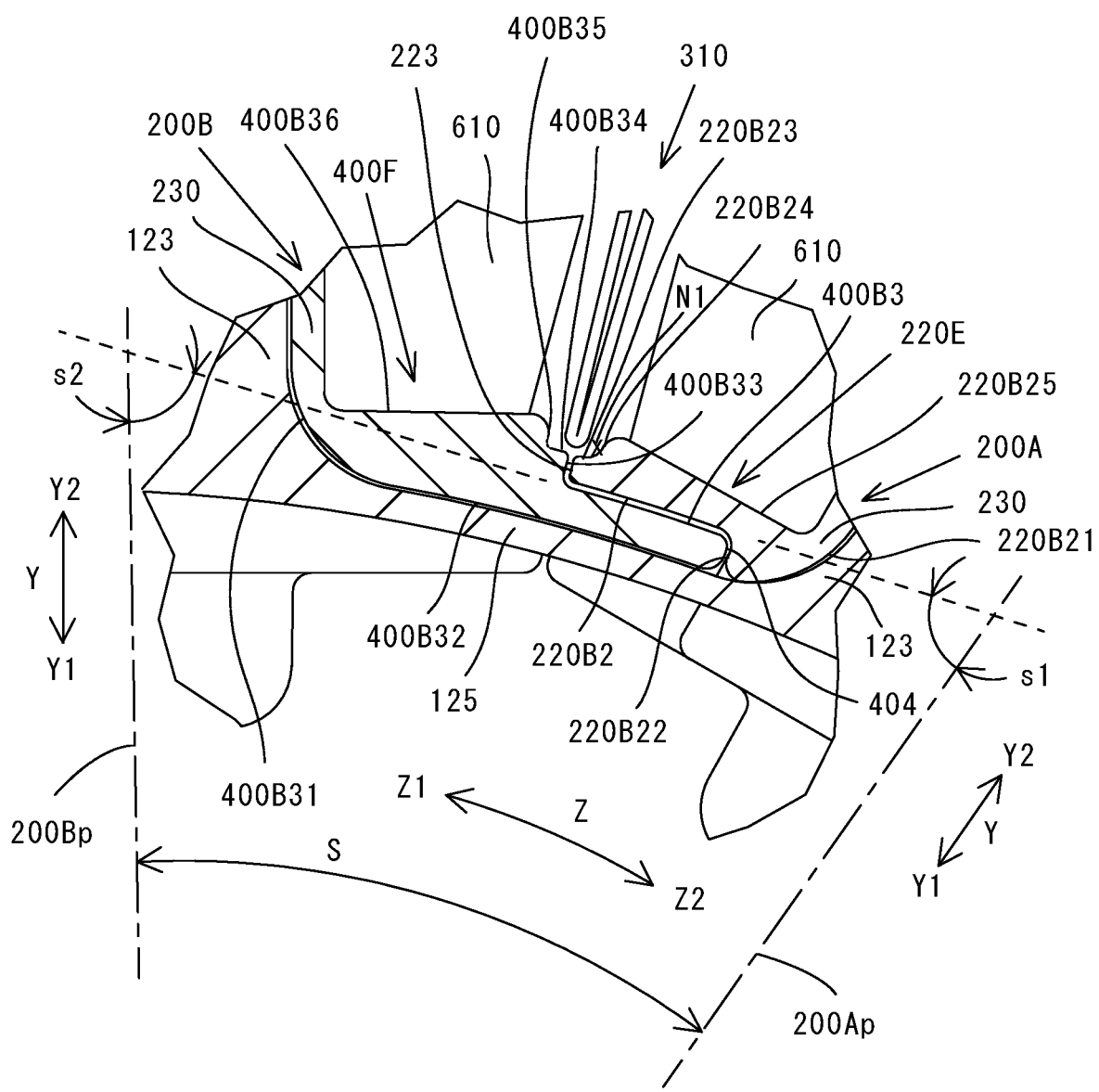
FIG. 24 shows an overlapping part of the first insulator that radially overlaps an overlapping part of the second insulator.
Figure 25:
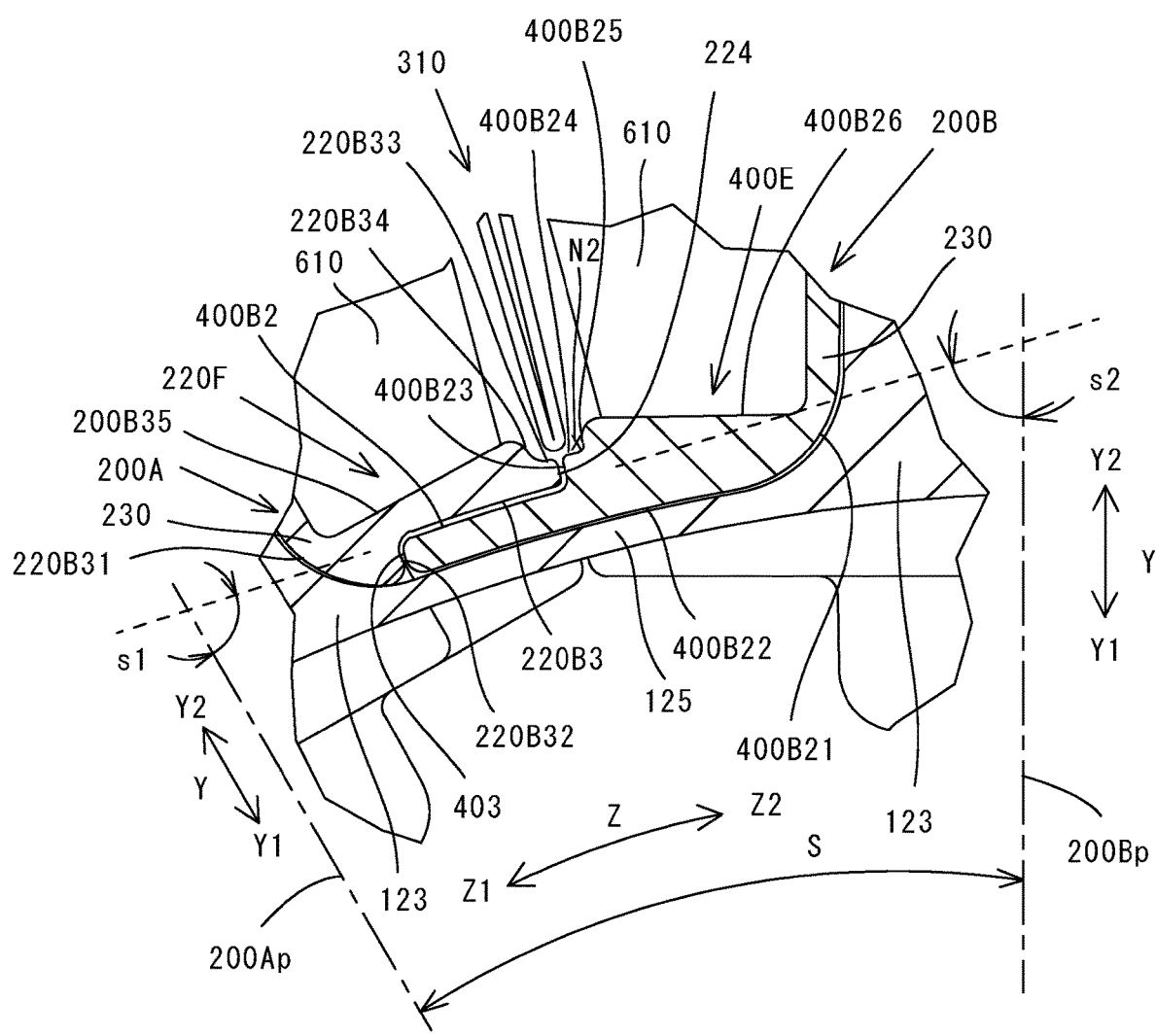
FIG. 25 shows an overlapping part of the first insulator that radially overlaps an overlapping part of the second insulator.

FIGS. 24 and 25 show principal parts of the first and second insulators 200A and 200B, which have been fitted onto circumferentially-adjacent teeth 121 of the first core member 120, in an enlarged view.

FIG. 24 shows the overlapping part 220E of the first insulator 200A and the adjacent overlapping part 400F of the second insulator 200B in a radially overlapped state.

FIG. 25 shows the overlapping part 220F of the first insulator 200A and the adjacent overlapping part 400E of the second insulator 200B in a radially overlapped state.

In this embodiment, in the state in which the adjacent insulators are overlapped with each other in regions extending in the circumferential direction and the axial direction (i.e. in the assembled state of the insulator assembly 200), the electrically insulating properties between the stator windings 610 wound around the first and second insulators 200A, 200B and the tooth tip parts 123 of the teeth 12 are enhanced. Accordingly, occurrence of locations having poor electrical insulation properties is prevented.

Further, the number of turns of the stator windings 610 wound around the insulator (200A, or 200B) can be increased, so that the space factor (fill factor) of the stator windings 610 within the slots defined by the stator core is improved.

Figure 26:
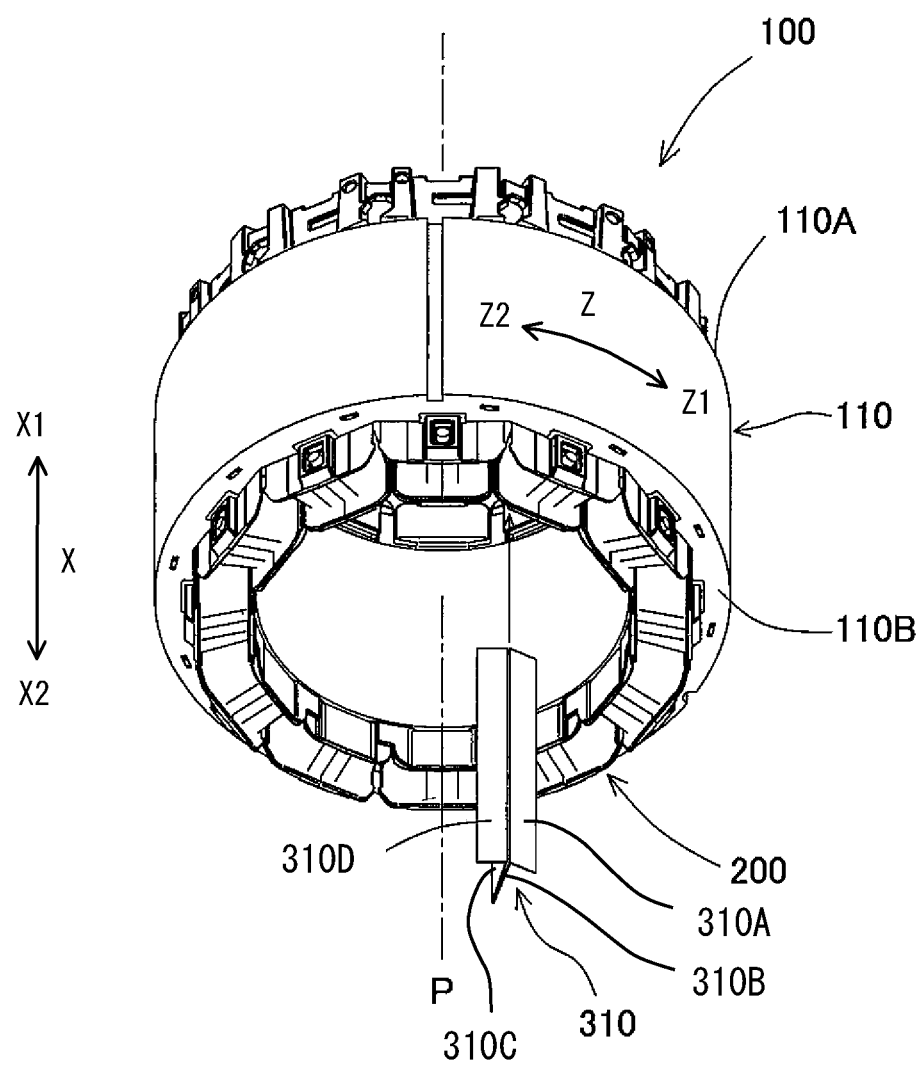
FIG. 26 is a drawing for illustrating how to insert a winding insulation member of the stator of the embodiment.

An exemplary method for inserting the winding insulation members 310 between adjacent stator windings 610 of different phases is now described with reference to FIGS. 26 to 28.

Figure 27:
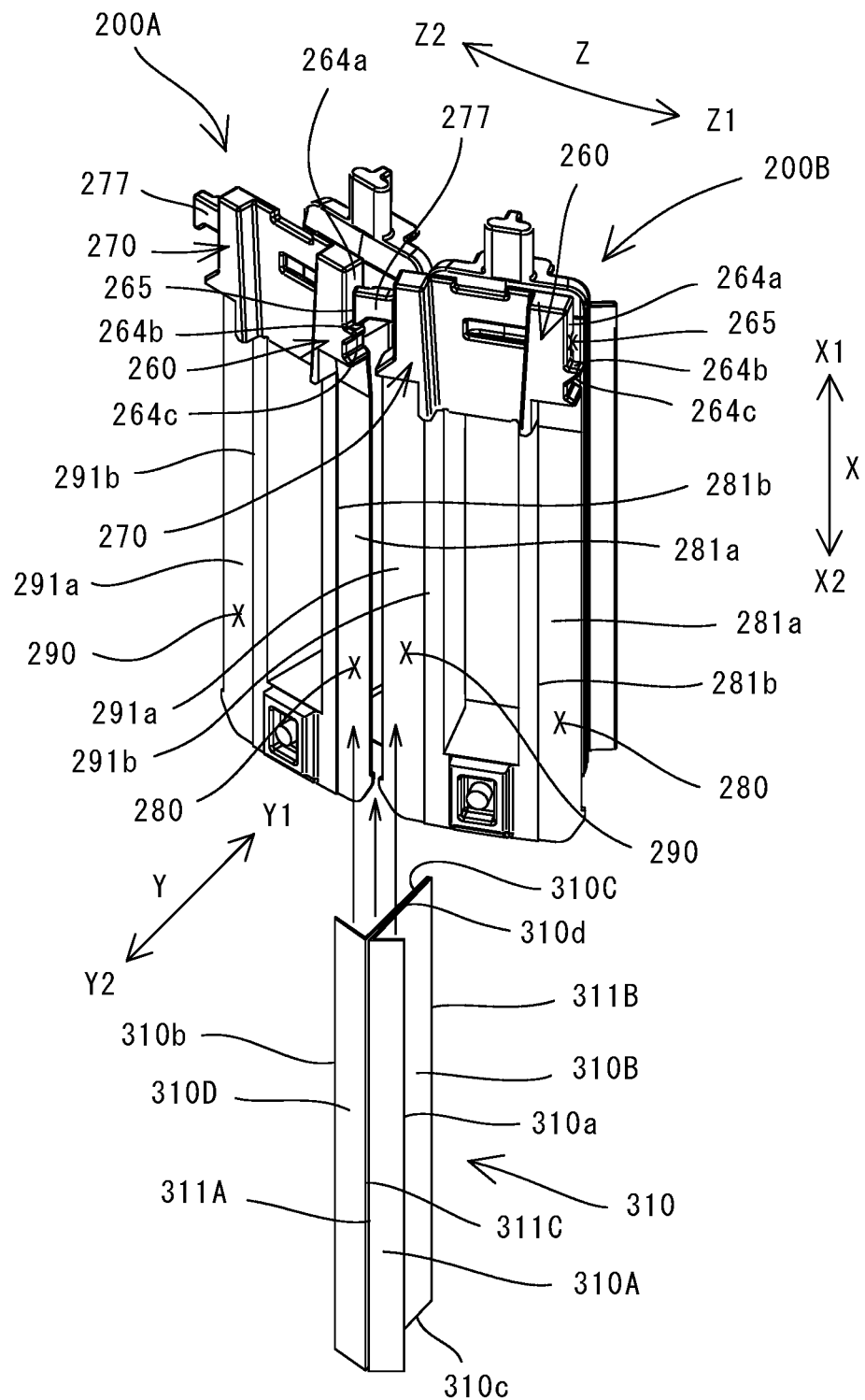
FIG. 27 is another drawing for illustrating how to insert the winding insulation member.

In this embodiment, as shown in FIG. 27, each of the winding insulation members 310 is formed as a substantially rectangular insulating film (foil, sheet) having four edges 310*a*, 310*b*, 310*c* and 310*d* by folding the film along folding lines 311A, 311B and 311C extending in the axial direction. Each winding insulation member 310 has a central part folded (along the folding line 311B) into a first central part 310B and a second central part 310C, and a pair of end parts (edge parts, flange parts) 310A and 310D folded in opposite directions from the two ends (sides) of the central part in the circumferential direction (along the folding lines 311A and 311C).

The winding insulation member 310 is placed (inserted) between two recessed parts 280 and 290 that are adjacent in the circumferential direction. For example, the winding insulation member 310 is placed in the recessed part 280 of the first insulator 200A and the recessed part 290 of the second insulator 200B that are adjacent in the circumferential direction. The central part of the winding insulation member 310 is inserted between the first and second insulators 200A and 200B.

In this embodiment, the recessed parts 280 and 290 are open to the other (second) side in the axial direction, so that the winding insulation member 310 can be easily inserted from the other (second) side in the axial direction (i.e. from below in FIG. 27).

The wall surfaces that define the recessed parts 280 and 290 restrict the position of the end parts 310A and 310D arranged in the recessed parts 280 and 290, in the circumferential direction and the axial direction.

Figure 28:
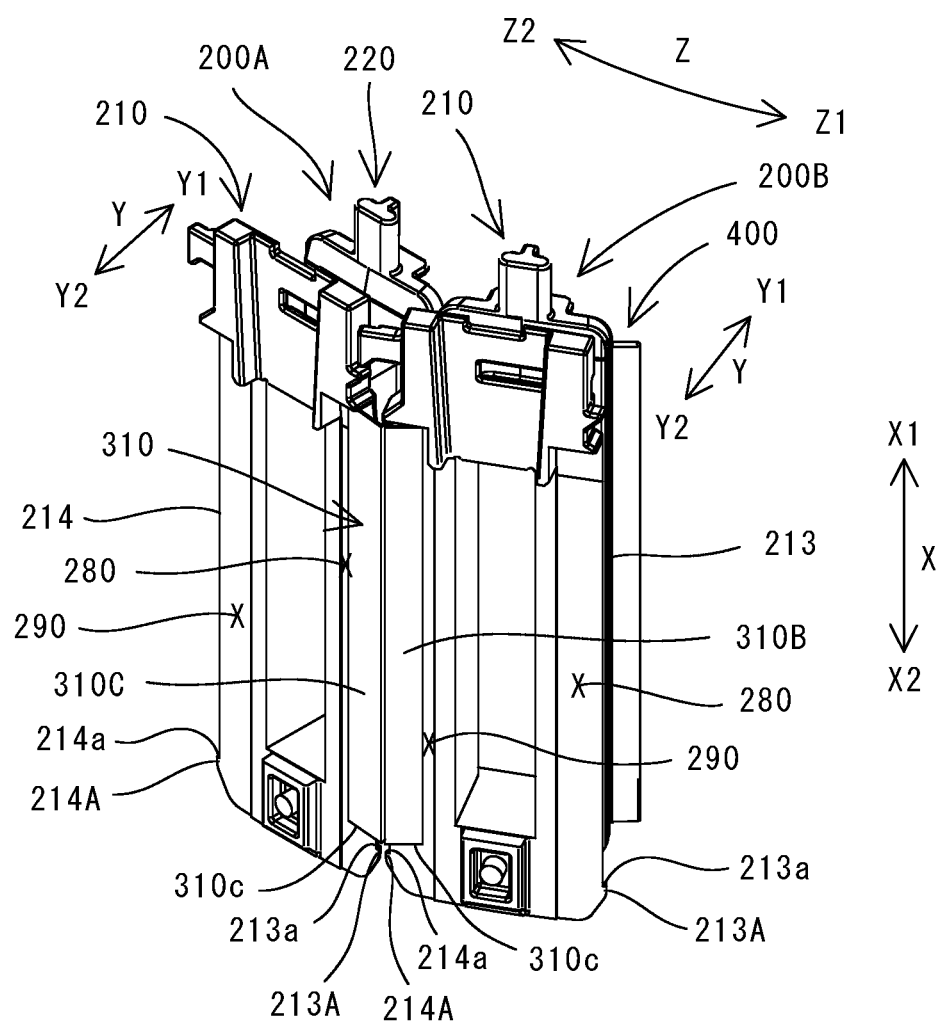
FIG. 28 shows the winding insulation member inserted in place.

FIG. 28 shows one of the winding insulation members 310 in the inserted state.

In this embodiment, the locking surface 213*a* is formed on (along) an end part (edge) of the side surface 213 of the first flange 210 on the other (second) side in the axial direction and extends toward the one (first) side in the circumferential direction. The locking surface 214*a* is formed on an end part (edge) of the side surface 214 of the first flange 210 on the other (second) side in the axial direction and extends toward the other (second) side in the circumferential direction.

The locking surface 213*a* and/or 214*a* restricts (blocks, limits, bounds) movement of the winding insulation member 310, which has been inserted into the slot of the stator core, toward the other (second) side in the axial direction. Specifically, a portion of the edge 310*c* (see FIG. 27) that forms an edge of the end part 310A (a portion of the edge 310*c* that forms an edge of the end part 310D) restricts (blocks, limits, bounds) movement of the winding insulation member 310 toward the other (second) side in the axial direction by abutting on the locking surface 214*a* (213*a*). This prevents the winding insulation member 310 from slipping off (out) from the slot.

Further, as shown in FIGS. 24 and 25, the tip end part of the central portion of the winding insulation member 310 is inserted in the recessed part (recess) N1 or N2. This prevents movement of the winding insulation member 310 and thus prevents occurrence of locations of poor electrical insulation properties that might otherwise be caused by (unrestricted) movement of one or more of the winding insulation members 310.

The present disclosure is not limited to the structures described in the above embodiment, but rather, may be added to, changed, replaced with alternatives or otherwise modified.

The shapes of the first and second insulators are not limited to those described in the above embodiment, and may be shaped such that the first and second insulators adjacent in the circumferential direction simply overlap each other.

In the above embodiment, two kinds of insulators (the first insulators (200A) and the second insulators (200B)) are used to form the insulator assembly 200, but three or more kinds of insulators may be used. Alternatively, one kind of insulators may be used. For example, the overlapping parts of the insulators on the one (first) side and the other (second) side in the circumferential direction may be shaped to be overlapped with each other.

In the above embodiment, the stator is described, but the present disclosure may be provided as "insulators" or a "motor having a stator with insulators and a rotor that is rotatably supported relative to the stator".

Further, the shape of the winding insulation members is not limited to that of the above embodiment.

Any of the technical features of the above embodiment may be used separately or in combination of appropriately selected ones.

DESCRIPTION OF THE REFERENCE NUMERALS

100: stator
110: stator core
110A, 110B: core end face
120: first core member
121: tooth
122: tooth base part
123: tooth tip part
124: tooth tip surface
125: connecting part
126, 136: calking projection
130: second core member
131: yoke
132: yoke outer peripheral surface
133: yoke inner peripheral surface
133*a*, 133*b*: yoke inner peripheral surface part
134*a*: recess forming face
200, 200A, 200B: insulator
210: first flange
210A, 220A, 400A: outer peripheral surface
210B, 220B, 400B: inner peripheral surface,
211, 212, 221A, 211B1, 211C1, 220B1, 221B1, 221C1, 222, 227, 401, 402, 405A, 451, 452: end surface
213, 214, 223, 221B, 221C, 224, 281*b*, 291*b*, 403, 404: side surface
220, 400: second flange
200Ap, 200Bp: center line in the circumferential direction
220B2, 220B21, 220B22, 220B3, 220B31, 220B32, 400B21, 400B22, 400B31, 400B32: inner peripheral surface part
220B23 to 220B25, 220B33 to 220B35, 400B2, 400B23 to 400B26, 400B3, 400B33 to 400B36: outer peripheral surface part
220E, 220F, 400E, 400F: overlapping part
211B, 211C, 213A, 214A, 221, 221B, 221C, 226B, 226C, 250, 260, 270, 277, 278, 405, 407B, 407C: projection
213*a*, 214*a*: locking surface 122a to 122d, 221A1, 221A2, 225, 251, 252, 261 to 264, 271 to 274: outer wall surface
226A, 407A: projection piece
240: through hole
241 to 244: inner wall surface
241a to 244a: inclined face
264a to 264e, 274a, 274b: outer wall surface part
265, 275: space
277: locking projection
280, 290, N1, N2: recessed part
281a, 291a: bottom surface
310: winding insulation member (interphase insulation member)
310a to 310d: edge
310B, 310C: central part
310A, 310D: end part
311A to 311C: folding line
610: stator winding
P: rotation center line (rotational axis)

The invention claimed is:

1. Electrical insulators configured to be respectively fitted onto radially-extending teeth of a stator that are spaced apart from each other in a circumferential direction and also extend in an axial direction, each one of the electrical insulators comprising:
a first flange that extends in the circumferential direction and the axial direction;
a second flange that is radially inward of the first flange and extends in the circumferential direction and the axial direction; and
a body that extends radially, connects the first flange and the second flange, and has a through hole configured to receive one of the radially-extending teeth,
wherein:
the second flange has first and second overlapping parts respectively formed on opposite sides of the through hole in the circumferential direction and extending in the circumferential direction and the axial direction,
the first overlapping part of each of the electrical insulators is configured to radially overlap the second overlapping part of an adjacent one of the insulators in the circumferential direction in a state in which the electrical insulators are respectively fitted onto the teeth of the stator,
the second overlapping part of each of the electrical insulators is configured to radially overlap the first overlapping part of an adjacent one of the insulators in the circumferential direction in the state in which the electrical insulators are respectively fitted onto the teeth of the stator,
the electrical insulators comprise first electrical insulators and second electrical insulators,
the first and second overlapping parts of the first electrical insulators are configured to be disposed radially outward of the first and second overlapping parts of adjacent ones of the second electrical insulators in the circumferential direction in the state in which the first and second electrical insulators are respectively fitted onto the teeth of the stator,
the first overlapping part of each of the first electrical insulators has a first abutment part configured to abut on a side surface of one of the first or second overlapping parts of an adjacent one of the second electrical insulators on a first side in the circumferential direction, and a second abutment part configured to abut on an end wall of the one of the first or second overlapping parts of the adjacent one of the second electrical insulators on a first side in the axial direction, and
the second overlapping part of each of the first electrical insulators has a first abutment part configured to abut on a side surface of the one of the first or second overlapping parts of another adjacent one of the second electrical insulators on a second side in the circumferential direction, and a second abutment part configured to abut on an end wall of the one of the first or second overlapping parts of the other adjacent one of the second electrical insulators on the first side in the axial direction.

2. The electrical insulators as defined in claim 1, wherein:
each of the first and second overlapping parts of the second electrical insulators has an abutment part,
the abutment part of the first overlapping part of the second electrical insulators is configured to abut on a side surface of second overlapping part of an adjacent one of the first electrical insulators on the first side in the circumferential direction; and
the abutment part of the second overlapping part of the second electrical insulators is configured to abut on a side surface of the first overlapping part of another adjacent one of the first electrical insulators on the second side in the circumferential direction.

3. The electrical insulators as defined in claim 2, wherein:
each of the first and second overlapping parts has an overlapping face extending in the circumferential direction and the axial direction in the state in which the first and second electrical insulators are respectively fitted onto the teeth of the stator,
the first and second overlapping parts of the first electrical insulators are configured to respectively overlap the first and second overlapping parts of the second electrical insulators such that the overlapping faces of the first electrical insulators are disposed radially outward of the overlapping faces of the second electrical insulators in the state in which the first and second electrical insulators are respectively fitted onto the teeth of the stator, and
each of the first and second overlapping parts of the second electrical insulators has a recess forming face that is disposed radially outward of the respective abutment parts of the first and second overlapping parts of the second electrical insulators in the state in which the first and second electrical insulators are respectively fitted onto the teeth of the stator, each of the recess forming faces defining a portion of a recessed part.

4. The electrical insulators as defined in claim 1, wherein:
each of the first and second overlapping parts has an overlapping face extending in the circumferential direction and the axial direction in the state in which the first and second electrical insulators are respectively fitted onto the teeth of the stator, and
each of the first and second overlapping parts are configured such that an open angle between the electrical insulators adjacent in the circumferential direction corresponds to an open angle between adjacent teeth in the circumferential direction in the state in which the overlapping faces of adjacent first and second overlapping parts are overlapped to face each other.

5. The electrical insulators as defined claim 1, wherein:
each of the first and second overlapping parts has an overlapping face extending in the circumferential direction and the axial direction in the state in which the first and second electrical insulators are respectively fitted onto the teeth of the stator, and the first and second overlapping parts are configured such that, in the state in which the first and second electrical insulators are respectively fitted onto the teeth of the stator, the overlapping face of the first or second overlapping part of the first electrical insulator is disposed radially outward of the overlapping face of the first or second overlapping part of the second insulator.

6. A stator, having:
a stator core that includes a yoke extending in a circumferential direction and teeth spaced apart from each other in the circumferential direction and extending radially inward from the yoke,
electrical insulators according to claim 1 respectively fitted onto the teeth, and
stator windings respectively wound around the electrical insulators fitted onto the teeth.

7. The stator as defined in claim 6, further comprising:
at least one winding insulation member,
wherein:
the at least one winding insulation member has a central part extending in an axial direction and a radial direction, and a pair of end parts folded in opposite directions from opposite ends of the central part in the circumferential direction and extending in the axial direction and the circumferential direction,
the first flange of the electrical insulators has a radially outer peripheral surface,
the radially outer peripheral surface of the first flange has a first recessed part formed on the first side of the through hole in the circumferential direction and a second recessed part formed on the second side of the through hole in the circumferential direction,
the first recessed part is open to the first side in the circumferential direction, to the second side in the axial direction and radially outwardly, and the second recessed part is open to the second side in the circumferential direction, the second side in the axial direction and radially outwardly, and
the central part of the winding insulation member is disposed between two of the electrical insulators that are adjacent in the circumferential direction, and the end parts of the winding insulation member are respectively disposed in the first recessed part of one of the electrical insulators adjacent in the circumferential direction and the second recessed part of the other of the electrical insulators.

8. The stator as defined in claim 7, wherein:
the first flange of the electrical insulators has a first side surface on the first side in the circumferential direction and a second side surface on the second side in the circumferential direction,
at least one of the first and second side surfaces of each of the electrical insulators has a projection located at the second side in the axial direction,
the projection of one of the electrical insulators is formed on the first side in the circumferential direction and protrudes from the side surface on the first side in the circumferential direction toward the second side in the circumferential direction,
the projection of another of the electrical insulators is formed on the second side in the circumferential direction and protrudes from the side surface on the second side in the circumferential direction toward the first side in the circumferential direction, and
in the state in which the electrical insulators are respectively fitted onto the teeth of the stator, the projections restrict movement of the at least one winding insulation member toward the second side in the axial direction.

9. The stator as defined in claim 6, wherein the stator core comprises a first core member having the teeth and a second core member having the yoke.

10. A motor, having a rotor that is supported to be rotatable relative to the stator defined in claim 6.

11. The stator as defined in claim 6, wherein:
each of the first and second overlapping parts has an overlapping face extending in the circumferential direction and the axial direction in the state in which the electrical insulators are respectively fitted onto the teeth of the stator, and
each of the first and second overlapping parts are configured such that an open angle between the electrical insulators adjacent in the circumferential direction corresponds to an open angle between adjacent teeth in the circumferential direction in the state in which the overlapping faces of adjacent first and second overlapping parts are overlapped to face each other.

12. The stator as defined in claim 11, wherein the first and second overlapping parts are configured such that, in the state in which the electrical insulators are respectively fitted onto the teeth of the stator, the overlapping face of the first or second overlapping part of the first electrical insulator is disposed radially outward of the overlapping face of the first or second overlapping part of the second insulator.

13. An electrical insulator assembly comprising:
first electrical insulators and second insulators disposed in an alternating manner around a circumferential direction of the electrical insulator assembly,
wherein:
each of the first and second electrical insulators has:
a first flange that extends in the circumferential direction and in an axial direction,
a second flange that is radially inward of the first flange and extends in the circumferential direction and the axial direction; and
a body that extends radially, connects the first flange and the second flange, and has a through hole configured to receive a tooth of a stator,
the second flange of each of the first and second electrical insulators has first and second overlapping parts respectively formed on a first side and a second side of the through hole in the circumferential direction, the first and second overlapping parts extending in the circumferential direction and the axial direction,
the first overlapping parts of the first electrical insulators respectively radially overlap the second overlapping parts of the second insulators and the second overlapping parts of the first electrical insulators respectively radially overlap the first overlapping parts of the second insulators,
the first and second overlapping parts of the first electrical insulators each have an overlapping face that is disposed radially outward of an overlapping face of the first and second overlapping parts of the second insulators,
the first overlapping part of each of the first electrical insulators has a first abutment part that abuts on a side surface of one of the first or second overlapping parts of an adjacent one of the second electrical insulators on a first side in the circumferential direction, and a second abutment part that abuts on an end wall of the one of the first or second overlapping parts of the adjacent one of the second electrical insulators on a first side in the axial direction, and the second overlapping part of each of the first electrical insulators has a first abutment part that abuts on a side surface of the one of the first or second overlapping parts of another adjacent one of the second electrical insulators on a second side in the circumferential direction, and a second abutment part that abuts on an end wall of the one of the first or second overlapping parts of the other adjacent one of the second electrical insulators on the first side in the axial direction.

14. The electrical insulator assembly as defined in claim 13, wherein:
each of the first and second overlapping parts of the second electrical insulators has an abutment part,
the abutment part of the first overlapping part of the second electrical insulators abuts on a side surface of second overlapping part of an adjacent one of the first electrical insulators on the first side in the circumferential direction; and
the abutment part of the second overlapping part of the second electrical insulators abuts on a side surface of the first overlapping part of another adjacent one of the first electrical insulators on the second side in the circumferential direction.

15. A stator, having:
a stator core that includes a yoke extending in a circumferential direction and teeth spaced apart from each other in the circumferential direction and extending radially inward from the yoke,
the electrical insulator assembly according to claim 14 fitted onto the teeth such that the teeth respectively extend through the through holes, and
stator windings respectively wound around the first and second electrical insulators.

16. The stator as defined in claim 15, wherein each of the first and second overlapping parts has an open angle between the first and second electrical insulators adjacent in the circumferential direction that corresponds an open angle between adjacent teeth in the circumferential direction.

* * * * *